US012787953B2

(12) United States Patent
Ogawa

(10) Patent No.: US 12,787,953 B2
(45) Date of Patent: Nov. 10, 2026

(54) INFORMATION PROCESSING DEVICE AND METHOD FOR CONTROLLING MACROSCOPIC MEASUREMENT BASED ON MICROSCOPIC MEASUREMENT EVENT DETECTION

(71) Applicant: SONY GROUP CORPORATION, Tokyo (JP)

(72) Inventor: Tetsu Ogawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 496 days.

(21) Appl. No.: 18/551,737

(22) PCT Filed: Feb. 21, 2022

(86) PCT No.: PCT/JP2022/006905
§ 371 (c)(1),
(2) Date: Sep. 21, 2023

(87) PCT Pub. No.: WO2022/209418
PCT Pub. Date: Oct. 6, 2022

(65) Prior Publication Data

US 2024/0164265 A1 May 23, 2024

(30) Foreign Application Priority Data

Mar. 31, 2021 (JP) ................................ 2021-060296

(51) Int. Cl.
*A01G 25/16* (2006.01)
*A01G 7/00* (2006.01)
(Continued)

(52) U.S. Cl.
CPC ............ *A01G 25/165* (2013.01); *A01G 7/00* (2013.01); *G06V 20/17* (2022.01); *G06V 20/188* (2022.01);
(Continued)

(58) Field of Classification Search
None
See application file for complete search history.

(56) References Cited

U.S. PATENT DOCUMENTS 12,198,424 B2 * 1/2025 Jacob ..................... G06T 7/187
2018/0035606 A1 * 2/2018 Burdoucci ........... A01D 34/008
(Continued)

FOREIGN PATENT DOCUMENTS

JP 2020-052660 A 4/2020
JP 2021-012433 A 2/2021
(Continued)

OTHER PUBLICATIONS

Eiichiro Fujiwara, Research on evaluation methods for plant water stress using hyperspectral imager measurements, Published: 2005, pp. 1-4 (Year: 2005).*

(Continued)

*Primary Examiner* — Howard Cortes
(74) *Attorney, Agent, or Firm* — CHIP LAW GROUP

(57) ABSTRACT

Provided is an information processing device that includes an event determining section that determines occurrence or nonoccurrence of an event on the basis of a measurement result of a microscopic measuring unit that performs measurement of a microscopic measurement area as an area of a first size in a measurement target, and a control section that, upon the event determining section determining that the event has occurred, controls a macroscopic measuring unit that performs measurement of a macroscopic measurement area as an area of a larger size than the first size in the measurement target to perform measurement targeted at the macroscopic measurement area having relation to the microscopic measurement area in which the event is determined to have occurred.

14 Claims, 21 Drawing Sheets

(51) Int. Cl.
*G06V 20/10* (2022.01)
*G06V 20/17* (2022.01)
*B64U 101/30* (2023.01)
*B64U 101/40* (2023.01)

(52) U.S. Cl.
CPC ...... *B64U 2101/30* (2023.01); *B64U 2101/40* (2023.01)

(56) References Cited

U.S. PATENT DOCUMENTS

| | | | | |
|---|---|---|---|---|
| 2018/0059691 | A1 | 3/2018 | Fleming et al. | |
| 2019/0035071 | A1* | 1/2019 | Klein | G06Q 10/20 |
| 2021/0201025 | A1* | 7/2021 | Ogawa | G06T 5/50 |
| 2022/0172467 | A1* | 6/2022 | Verma | G06V 20/194 |

FOREIGN PATENT DOCUMENTS

| | | | |
|---|---|---|---|
| WO | 2019/082519 | A1 | 5/2019 |
| WO | 2020/075782 | A1 | 4/2020 |
| WO | 2020/250707 | A1 | 12/2020 |

OTHER PUBLICATIONS

Fujiwara, et al., "A study on the evaluation method of water stress on crops using the portable hyperspectral imager", Bimonthly journal of the Institute of Industrial Science, vol. 57, No. 4, Dec. 16, 2017, pp. 390-393.

International Search Report and Written Opinion of PCT Application No. PCT/JP2022/006905, issued on May 17, 2022, 12 pages of ISRWO.

* cited by examiner

FIG. 17

| | | | SPECTRAL REFLECTANCE | | | | | |
|---|---|---|---|---|---|---|---|---|
| INCIDENCE ANGLE | REFLECTION ANGLE | RELATIVE AZIMUTH ANGLE | 400nm | 410nm | ·· | | | 800nm |
| 0 | 0 | | 0.2 | 0.21 | | | | 0.61 |
| 0 | 15 | | 0.15 | 0.16 | | | | 0.56 |
| 0 | 30 | | 0.1 | 0.11 | | | | 0.51 |
| : | : | | | | | | | |
| 15 | 0 | | 0.14 | 0.16 | | | | 0.55 |
| 15 | 15 | | 0.25 | 0.27 | | | | 0.62 |
| : | : | | | | | | | |

BRF TABLE

FIG. 19

BRF TABLE

| INCIDENCE ANGLE | REFLECTION ANGLE | RELATIVE AZIMUTH ANGLE | SPECTRAL REFLECTANCE | | | | | |
|---|---|---|---|---|---|---|---|---|
| | | | 400nm | 410nm | ·· | | | 800nm |
| 0 | 0 | | 0.2 | 0.21 | | | | 0.61 |
| 0 | 15 | | 0.15 | 0.16 | | | | 0.56 |
| 0 | 30 | | 0.1 | 0.11 | | | | 0.51 |
| : | : | | c | | | | | |
| 15 | 0 | | 0.14 | 0.16 | | | | 0.55 |
| 15 | 15 | | 0.25 | 0.27 | | | | 0.62 |
| : | : | | b | | | | | |

CORRECTION COEFFICIENT k = c/b

MACROSCOPICALLY MEASURED SPECTRAL REFLECTANCE

| INCIDENCE ANGLE | REFLECTION ANGLE | RELATIVE AZIMUTH ANGLE | 400nm | 410nm | ·· | | | 800nm |
|---|---|---|---|---|---|---|---|---|
| 15 | 15 | | 0.19 | 0.22 | | | | 0.59 |

a

INFORMATION PROCESSING DEVICE AND METHOD FOR CONTROLLING MACROSCOPIC MEASUREMENT BASED ON MICROSCOPIC MEASUREMENT EVENT DETECTION

CROSS REFERENCE TO RELATED APPLICATIONS

This application is a U.S. National Phase of International Patent Application No. PCT/JP2022/006905 filed on Feb. 21, 2022, which claims priority benefit of Japanese Patent Application No. JP 2021-060296 filed in the Japan Patent Office on Mar. 31, 2021. Each of the above-referenced applications is hereby incorporated herein by reference in its entirety.

TECHNICAL FIELD

The present technology relates to an information processing device, an information processing method, and a program, and particularly to a technology for performing measurement of a predetermined measurement target as a field or the like in which a plant is cultivated, for example.

BACKGROUND ART

There have been efforts to remotely sense a vegetation state of a plant by mounting an imaging device in a small flight vehicle such, for example, as a drone or the like, and imaging the vegetation state while the flight vehicle moves in the air above a field.

As such remote sensing, there may be a case of performing a macroscopic measurement that measures the measurement target at a high altitude in order to macroscopically analyze a relatively wide area of the field and a case of performing a microscopic measurement that measures the measurement target at a low altitude in order to enable analysis at a high spatial resolution that is difficult to achieve with the macroscopic measurement.

PTL 1 below discloses a technology in which, in a satellite system including a transmitting device installed on the earth and an artificial satellite including an imaging device, the transmitting device transmits an imaging instruction to the artificial satellite passing in the sky according to a predetermined event detected by a sensor installed on the earth, and the artificial satellite performs imaging on the basis of the imaging instruction.

CITATION LIST

Patent Literature

[PTL 1]
International Publication WO2020/250707

SUMMARY

Technical Problem

Here, the technology of PTL 1 above can be reworded as one in which a macroscopic measuring unit as the imaging device provided to the artificial satellite performs measurement according to detection of occurrence of an event on the basis of a measurement result of a microscopic measuring unit on the earth.

However, with such a technology described in PTL 1, there is a fear that the imaging device of the artificial satellite may perform measurement of a needlessly wide area according to the detection of the event. There is thus a fear that it may be difficult to achieve an improvement in efficiency of the macroscopic measurement.

The present technology has been made in view of the above circumstances. It is an object of the present technology to achieve, for a measurement system that performs a microscopic measurement and a macroscopic measurement of a measurement target, an improvement in accuracy of macroscopic analysis of the measurement target which analysis is performed on the basis of the macroscopic measurement and an improvement in efficiency of the macroscopic measurement.

Solution to Problem

An information processing device according to the present technology includes an event determining section configured to determine occurrence or nonoccurrence of an event on the basis of a measurement result of a microscopic measuring unit configured to perform measurement of a microscopic measurement area as an area of a first size in a measurement target, and a control section configured to perform control, in a case where the event determining section determines that the event has occurred, such that a macroscopic measuring unit configured to perform measurement of a macroscopic measurement area as an area of a larger size than the first size in the measurement target performs measurement targeted at the macroscopic measurement area having relation to the microscopic measurement area in which the event is determined to have occurred.

In the measurement of the macroscopic measuring unit, the target area has a large size. Therefore, the spatial resolution of the measurement tends to be low, and accuracy of determination of occurrence or nonoccurrence of the event also tends to be low. An improvement in the accuracy of determination of occurrence or nonoccurrence of the event is achieved by determining the occurrence or nonoccurrence of the event on the basis of the measurement result with regard to the microscopic measurement area of smaller size than the macroscopic measurement area, as described above.

In addition, a device form as a flight vehicle such, for example, as a drone, a device form as a stationary type fixedly disposed with respect to the measurement target, or the like is conceivable as the microscopic measuring unit. In any case, the frequency of the microscopic measurement is increased more easily than the frequency of the macroscopic measurement (the flight vehicle is at a lower altitude, or the stationary type obviates a need for a flight itself). There is thus an advantage in terms of the temporal resolution of measurement. An improvement in the accuracy of determination of occurrence or nonoccurrence of the event is achieved also in this respect.

In addition, according to the above-described configuration, in a case where the event has occurred in the microscopic measurement area, the measurement targeted at the macroscopic measurement area having relation to the microscopic measurement area in which the event has occurred is performed as the macroscopic measurement. Consequently, it is possible to perform the macroscopic analysis by setting, as the macroscopic measurement area, an area having relation to the microscopic measurement area in which the event has occurred, such, for example, as an area in which the same kind of plant as in the microscopic measurement area in which the event has occurred is cultivated, an area having a soil property similar to that of the microscopic measurement area in which the event has occurred, or the like. That is, instead of performing the macroscopic analysis targeted at a needlessly large area, the macroscopic measurement for the macroscopic analysis can be performed efficiently while limited to the area having relation to the microscopic measurement area in which the event has occurred.

An information processing method according to the present technology is an information processing method for an information processing device to perform processing including determining occurrence or nonoccurrence of an event on the basis of a measurement result of a microscopic measuring unit configured to perform measurement of a microscopic measurement area as an area of a first size in a measurement target, and performing control, in a case where it is determined that the event has occurred, such that a macroscopic measuring unit configured to perform measurement of a macroscopic measurement area as an area of a larger size than the first size in the measurement target performs measurement targeted at the macroscopic measurement area having relation to the microscopic measurement area in which the event is determined to have occurred.

In addition, a program according to the present technology is a program for causing an information processing device to perform the processing of the above-described method. The information processing device according to the present technology described above can be implemented by the information processing method and the program.

BRIEF DESCRIPTION OF DRAWINGS

FIG. 17 is a diagram of assistance in explaining a BRF table.

FIG. 19 is a diagram of assistance in explaining a method of correcting spectral reflectance.

DESCRIPTION OF EMBODIMENTS

Embodiments will hereinafter be described in the following order.

<1. First Embodiment>
(1-1. System Configuration according to First Embodiment)
(1-2. Configuration of Microscopic Measuring Unit and Macroscopic Measuring Unit in First Embodiment)
(1-3. Configuration of Information Processing Device)
(1-4. Measuring Method as First Embodiment)
(1-5. Processing Procedure)
<2. Second Embodiment>
(2-1. Microscopic Measuring Unit and Macroscopic Measuring Unit in Second Embodiment)
(2-2. Measuring Method as Second Embodiment)
(2-3. Processing Procedure)
<3. Modifications>
<4. Summary of Embodiments>
<5. Present Technology>

1. First Embodiment

1-1. System Configuration of First Embodiment

Figure 1:
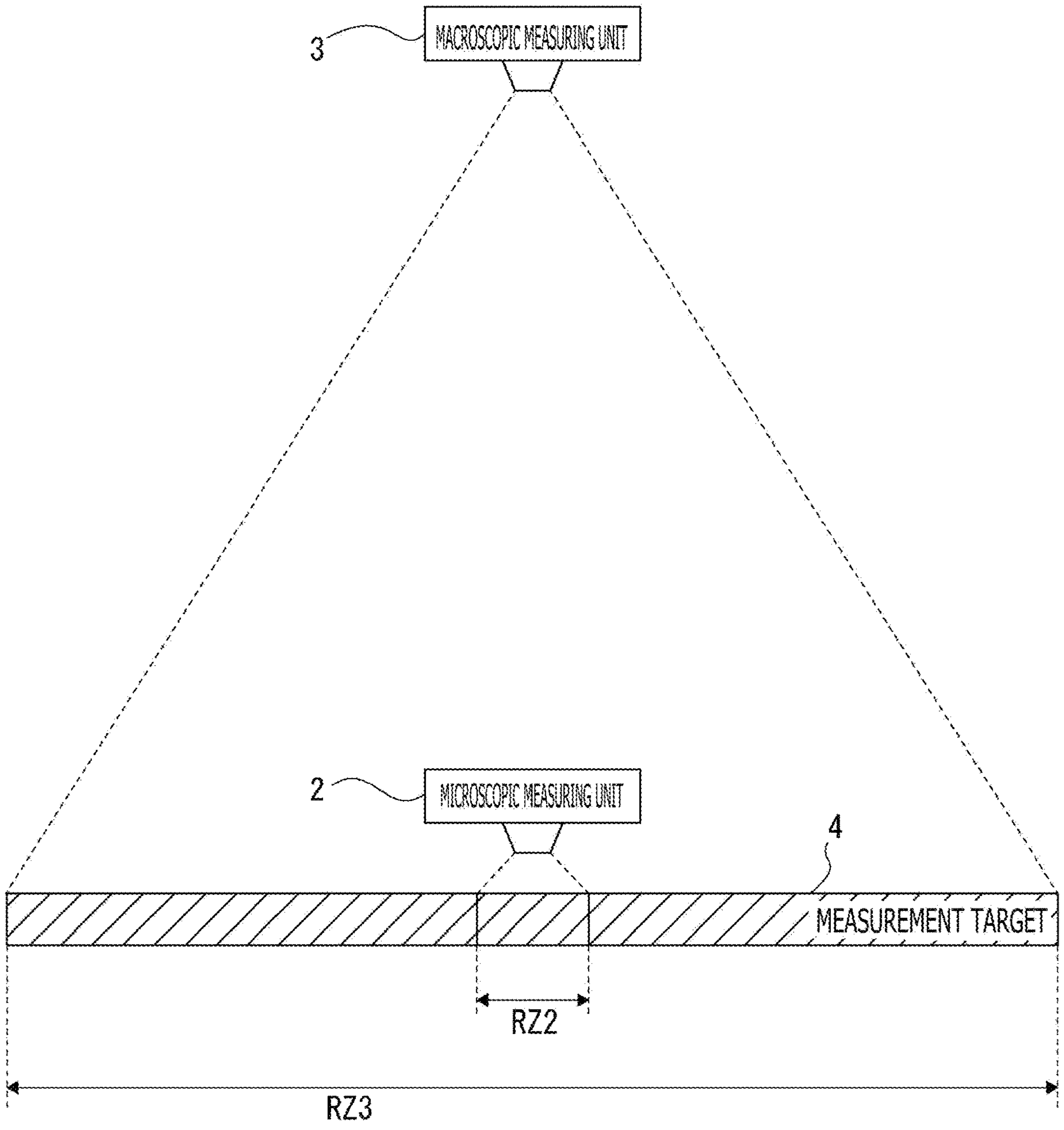
FIG. 1 is a diagram of assistance in explaining a macroscopic measuring unit and a microscopic measuring unit in a measurement system as a first embodiment of the present technology.

FIG. 1 illustrates a microscopic measuring unit 2 and a macroscopic measuring unit 3 constituting a measurement system as a first embodiment.

The microscopic measuring unit 2 performs a measurement of a measurement target 4 at a relatively close position. A measurement range in which the microscopic measuring unit 2 performs a measurement in one unit is a relatively narrow range illustrated as a microscopic measurement range RZ2. Incidentally, though depending on the type of the measurement, one unit is a range or the like in which image capturing of one frame is performed, for example, in a case of a camera.

In contrast, the macroscopic measuring unit 3 performs a measurement of the measurement target 4 from a position more distant than the microscopic measuring unit 2. A measurement range in which the macroscopic measuring unit 3 performs a measurement in one unit is a range that is illustrated as a macroscopic measurement range RZ3 and which is wider than the microscopic measurement range RZ2.

Thus, the area of the microscopic measurement range RZ2 in the measurement target 4 can be covered by the macroscopic measurement range RZ3. Incidentally, the macroscopic measurement range RZ3 can be a range not overlapping the microscopic measurement range RZ2.

Figure 2:
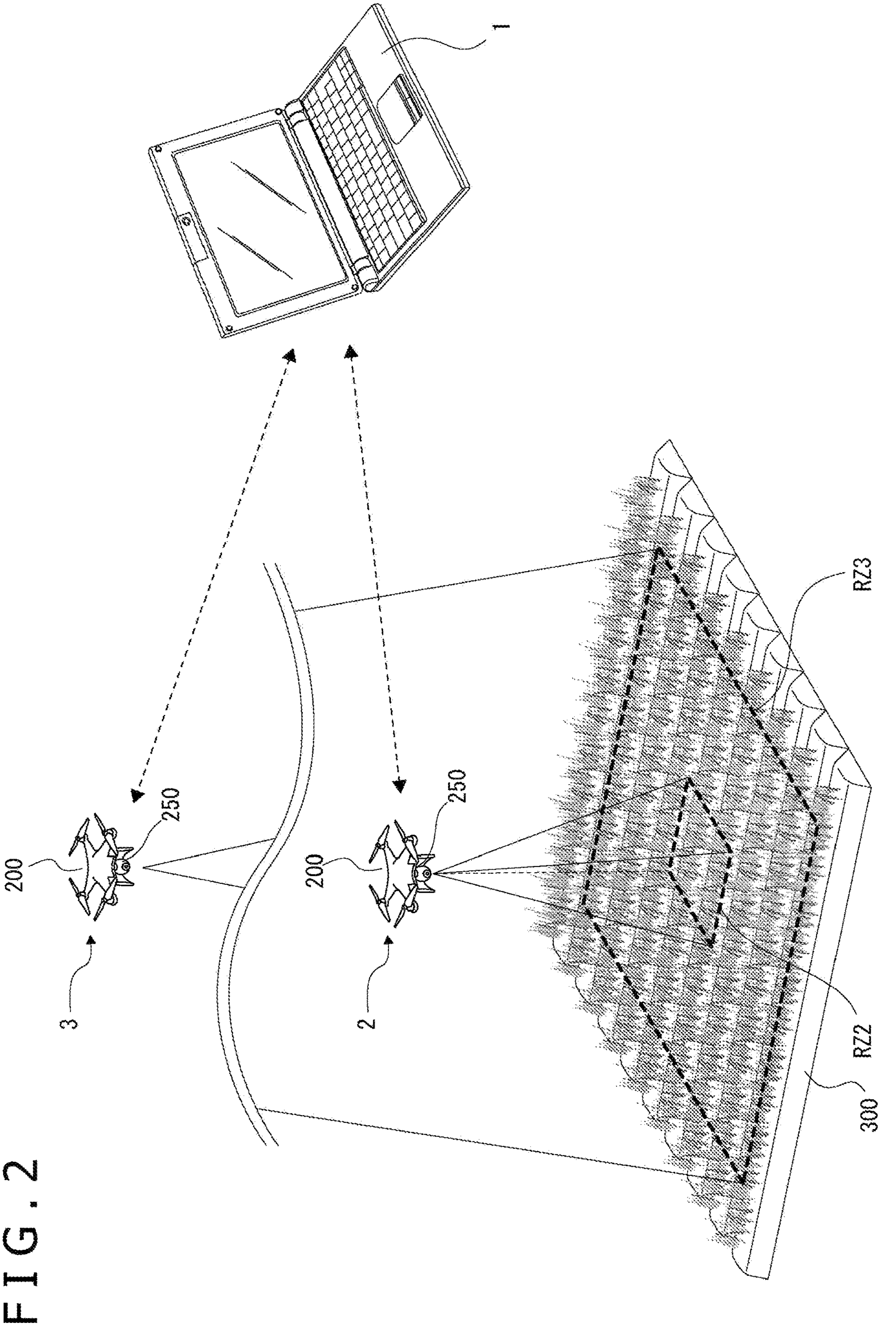
FIG. 2 is a diagram of assistance in explaining an example of remote sensing for a field in the first embodiment.

A system that performs a measurement with regard to a vegetation state in a field 300 as illustrated in FIG. 2, for example, is cited as an example of the measurement system that uses the microscopic measuring unit 2 and the macroscopic measuring unit 3 as described above.

FIG. 2 illustrates a state of the field 300. Recently, efforts have been made to remotely sense the vegetation state by using an imaging device 250 mounted in a small flight vehicle 200 such, for example, as a drone as in FIG. 2.

The flight vehicle 200 can be moved in the air above the field 300 through, for example, wireless steering of an operator, automated steering, or the like.

The imaging device 250 is set in the flight vehicle 200 so as to capture an image of an area below, for example. The imaging device 250, for example, periodically performs still image capturing while the flight vehicle 200 moves in the air above the field 300 in a predetermined path.

In the first embodiment, such a flight vehicle 200 and such an imaging device 250 serve as both the microscopic measuring unit 2 and the macroscopic measuring unit 3 illustrated in FIG. 1. That is, the flight vehicle 200 and the imaging device 250 function as the microscopic measuring unit 2 when performing imaging at a low altitude, and the flight vehicle 200 and the imaging device 250 function as the macroscopic measuring unit 3 when performing imaging at a high altitude.

Here, assumed as the imaging device 250 that is to constitute the microscopic measuring unit 2 and the macroscopic measuring unit 3, that is, a specific sensor used for microscopic measurement and macroscopic measurement is a visible light image sensor (image sensor that images visible light of R (red), G (green), and B (blue)), a stereo camera, a Lidar (laser image detecting and ranging sensor), a polarization camera, a ToF (Time of Flight) sensor, a camera for NIR (Near Infra Red: near-infrared region) image capturing, or the like.

In addition, a multi-spectrum camera that performs image capturing in a plurality of wavelength bands can be used as the imaging device 250. For example, one that performs capturing of an NIR image and an R (red) image, and is able to calculate an NDVI (Normalized Difference Vegetation Index) from the obtained images or the like may be used. Incidentally, the NDVI is an index indicating a state of distribution and activity of vegetation. In addition, as the multi-spectrum camera, one that can calculate various kinds of physical property values such, for example, as information related to photosynthesis can be used.

Incidentally, the multi-spectrum camera referred to in the present specification is a general term for cameras capable of imaging in a plurality of wavelength bands, and includes not only what is generally called a multi-spectrum camera but also what is called a hyperspectral camera (Hyper Spectrum Camera) or the like.

The sensor of the microscopic measuring unit 2 is preferably a sensor suitable for analysis of, for example, a character, environmental response, environmental conditions (a range, a distribution, and the like), or the like of the measurement target. Incidentally, the character is a static shape and characteristic of the measurement target. The environmental response is a dynamic shape and characteristic of the measurement target. The environmental conditions are a state of an environment in which the measurement target is present, and are a range and a distribution in which the measurement target is present, characteristics of the environment, and the like.

For example, variations in a stomatal opening degree and a photosynthesis state of a plant (environmental responses) are observed in a relatively short period of time according to variations in temperature, sunshine intensity, and a soil water content environment. These environmental responses can be optically observed from the outside of the plant by observing chlorophyll fluorescence emitted from the plant or measuring variation in spectral reflectance of leaves in a case where a spectral characteristic changes with a change in molecular structure as means for an environmental response of the plant.

Here, in the present embodiment, the imaging device 250 serves as both of the sensors of the microscopic measuring unit 2 and the macroscopic measuring unit 3. Therefore, the microscopic measuring unit 2 has a higher spatial resolution in measurement than the macroscopic measuring unit 3.

Incidentally, it is not essential that the common flight vehicle 200 and the common imaging device 250 serve as both the microscopic measuring unit 2 and the macroscopic measuring unit 3. The microscopic measuring unit 2 and the macroscopic measuring unit 3 can be configured separately from each other. Also in this case, the spatial resolution in measurement of the microscopic measuring unit 2 can be made higher than that of the macroscopic measuring unit 3.

In addition, in the present embodiment, because the macroscopic measuring unit 3 performs measurement at a higher altitude than the microscopic measuring unit 2, the frequency of measurement of the microscopic measuring unit 2 can be made higher.

As will be described later, in the present embodiment, the frequency of measurement of the microscopic measuring unit 2 is set higher than the frequency of measurement of the macroscopic measuring unit 3, and the temporal resolution in measurement of the microscopic measuring unit 2 is made higher than that of the macroscopic measuring unit 3.

Incidentally, tag information can be added to an image obtained by imaging by the imaging device 250. The tag information includes imaging date and time information, positional information as GNSS (Global Navigation Satellite System) data (information regarding a latitude, a longitude, and an altitude), imaging device information (individual identification information, model information, and the like of the camera), information regarding each piece of image data (information regarding image size, wavelengths, imaging parameters, and the like), and the like.

Incidentally, the positional information and the imaging date and time information function also as information identifying which of the microscopic measuring unit 2 and the macroscopic measuring unit 3 has produced a measurement result.

The image data and the tag information obtained by the imaging device 250 mounted in the flight vehicle 200 are sent to an information processing device 1. The information processing device 1 generates analytical information with the field 300 as the measurement target 4 by using the image data and the tag information. In addition, processing of presenting a result of analysis as an image to a user is performed.

The information processing device 1 is, for example, implemented as a PC (Personal Computer), an FPGA (Field-Programmable Gate Array), a terminal device such as a smart phone or a tablet.

Incidentally, while the information processing device 1 is illustrated as a device separate from the imaging device 250 in FIG. 2, an arithmetic device (microcomputer or the like) serving as the information processing device 1 can be provided within a unit including the imaging device 250, for example.

Figure 3:
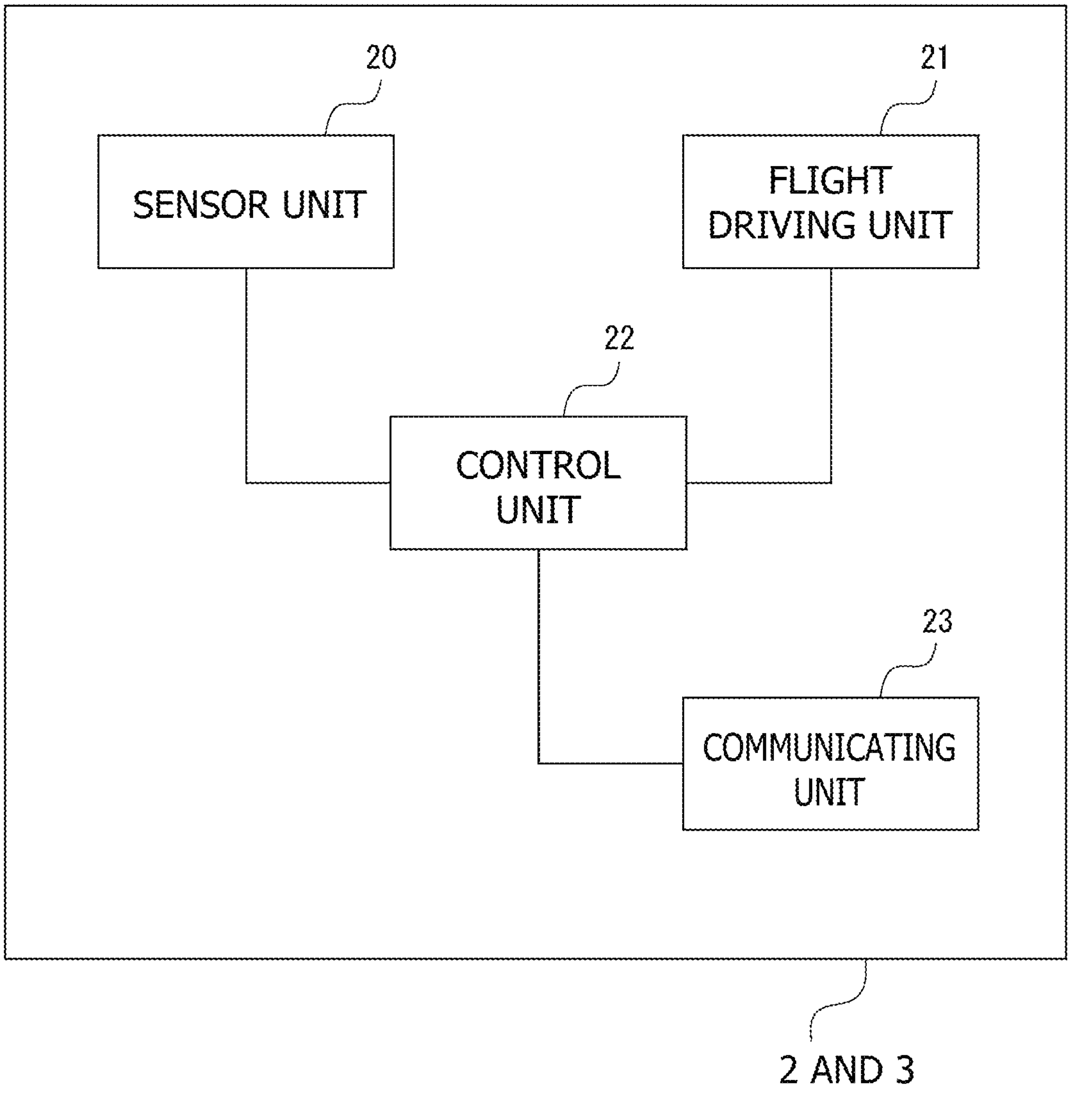
FIG. 3 is a diagram illustrating an example of an internal configuration of the microscopic measuring unit and the macroscopic measuring unit in the first embodiment.

1-2. Configuration of Microscopic Measuring Unit and Macroscopic Measuring Unit in First Embodiment FIG. 3 illustrates an example of an internal configuration of the microscopic measuring unit 2 and the macroscopic measuring unit 3 in the first embodiment.

In the first embodiment, the microscopic measuring unit 2 and the macroscopic measuring unit 3 can be represented as including a sensor unit 20, a flight driving unit 21, a control unit 22, and a communicating unit 23 as illustrated in the figure.

The sensor unit 20 comprehensively represents sensors that perform sensing for measurement. The sensor unit 20 includes at least the imaging device 250 illustrated in FIG. 2.

Here, the sensors included in the sensor unit 20 include not only the imaging device 250 but also a position sensor that detects positional information such, for example, as GNSS information, a sunlight spectroscopic sensor that performs a wavelength spectroscopic detection of sunlight, and the like.

In the present example, the multi-spectrum camera used as the imaging device 250 in the sensor unit 20 is configured to be able to calculate at least a PRI as an evaluation value of the plant included in the measurement target 4. Incidentally, the PRI is obtained by indexing spectral reflectance that changes with deepoxidation in a xanthophyll cycle. The xanthophyll cycle is a mechanism that releases, as heat, excessive light energy that cannot be fully photosynthesized, such as the closure of stomata which closure accompanies strong light or water stress.

Specifically, the imaging device 250 is configured to be able to obtain at least captured images of two wavelengths, that is, a wavelength $\lambda$=531 nm and a wavelength $\lambda$=570 nm.

The flight driving unit 21 comprehensively represents driving units for driving mechanisms for a flight of the flight vehicle 200. For example, in a case where the flight vehicle 200 is a drone, the mechanisms for flight are, for example, propellers or the like, and the driving units are actuators such as motors for rotationally driving the propellers.

The control unit 22 includes a microcomputer including, for example, a CPU (Central Processing Unit) 51, a ROM (Read Only Memory) 52, a RAM (Random Access Memory), and the like. The CPU, for example, performs processing based on a program stored in the ROM. The control unit 22 thereby controls the sensor unit 20 and the flight driving unit 21.

For example, as the control of the sensor unit 20, the control unit 22 controls imaging operation of the imaging device 250. In addition, the control unit 22 performs flight control of the flight vehicle 200 by giving various kinds of instructions to the flight driving unit 21.

The communicating unit 23, for example, performs communication processing via a network including the Internet and communication by wire or wirelessly (for example, short-range wireless communication or the like) with a peripheral device.

The control unit 22 can exchange various kinds of data with an external device via the communicating unit 23.

1-3. Configuration of Information Processing Device

Figure 4:
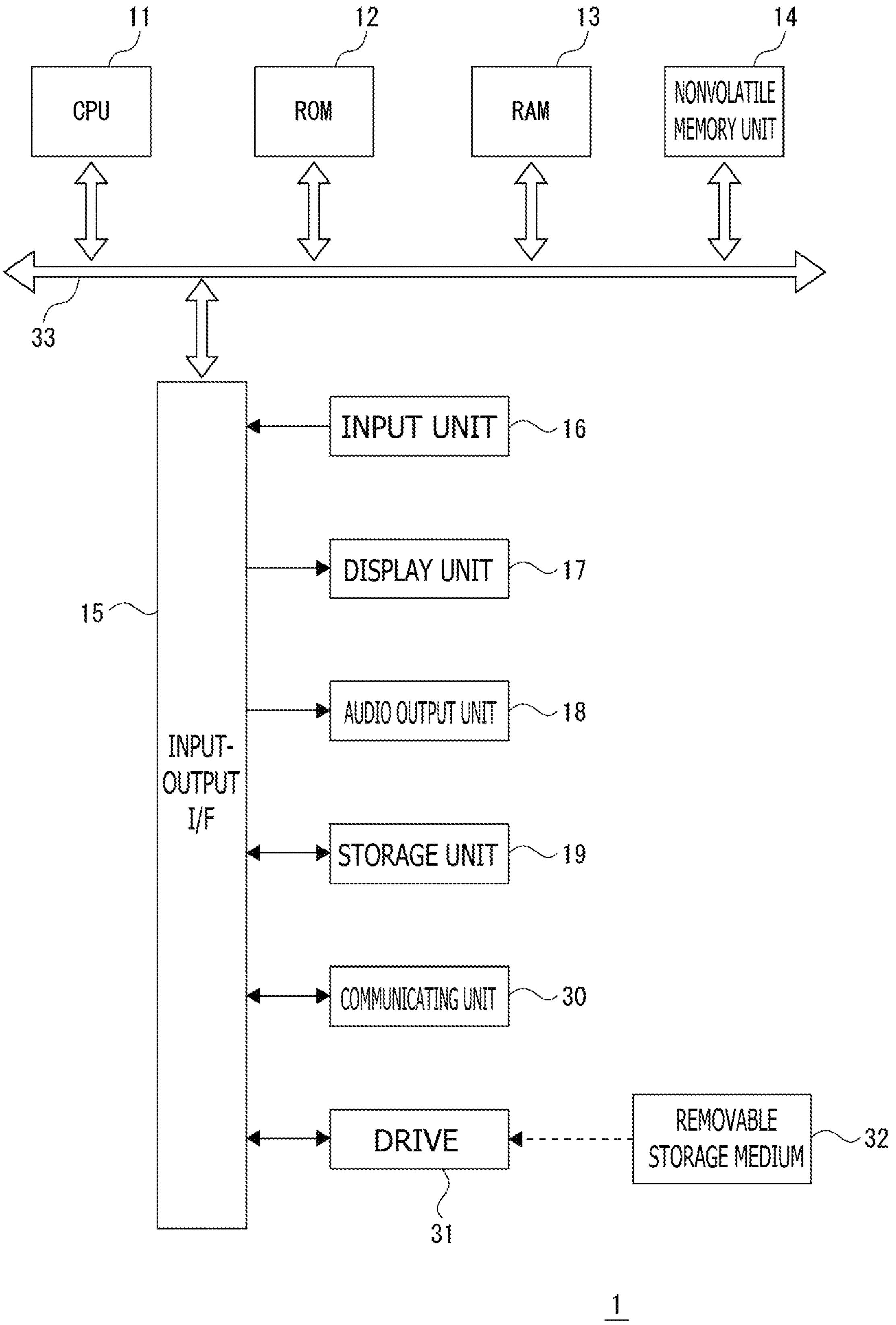
FIG. 4 is a diagram illustrating an example of a hardware configuration of an information processing device as an embodiment.

FIG. 4 illustrates an example of a hardware configuration of the information processing device 1.

As illustrated in the figure, the information processing device 1 includes a CPU 11, a ROM (Read Only Memory) 12, and a RAM (Random Access Memory) 13.

The CPU 11 performs various kinds of processing according to a program stored in the ROM 12 or a program loaded from a storage unit 19 to be described later into the RAM 13. The RAM 13 also stores data and the like necessary for the CPU 11 to perform various kinds of processing as appropriate.

The CPU 11, the ROM 12, and the RAM 13 are interconnected via a bus 33. An input-output interface 15 is also connected to the bus 33.

The input-output interface 15 can be connected with an input unit 16 for the user to perform an input operation, a display unit 17 constituted by a liquid crystal panel, an organic EL (Electroluminescence) panel, or the like, an audio output unit 18 constituted by a speaker or the like, a storage unit 19, a communicating unit 30, and the like.

The input unit 16 means an input device used by a user using the information processing device 1.

For example, assumed as the input unit 16 are various kinds of operating elements and operating devices such as a keyboard, a mouse, keys, a dial, a touch panel, a touch pad, and a remote controller. The input unit 16 detects an operation of the user. The CPU 11 interprets a signal corresponding to the input operation.

The display unit 17 may be integral with the information processing device 1, or may be an apparatus separate from the information processing device 1. The display unit 17 displays various kinds of analysis results and the like on a display screen on the basis of instructions from the CPU 11. In addition, the display unit 17 displays various kinds of operation menus, icons, messages, and the like, that is, makes display as a GUI (Graphical User Interface) on the basis of instructions from the CPU 11.

The storage unit 19 is, for example, constituted by a storage medium such as an HDD (Hard Disk Drive), or a solid-state memory. The storage unit 19 stores, for example, data indicating results of measurements of the microscopic measuring unit 2 and the macroscopic measuring unit 3, data indicating results of various kinds of analysis performed on the basis of the measurement results, and various other pieces of data. The storage unit 19 is also used to store program data for analysis processing and the like.

The communicating unit 30 performs communication processing via a network including the Internet and communication by wire or wirelessly (for example, short-range wireless communication or the like) with a peripheral device.

The communicating unit 30 may, for example, be a communicating device that performs communication with the microscopic measuring unit 2 and the macroscopic measuring unit 3.

The input-output interface 15 is also connected with a drive 31 as required. A removable storage medium 32 such as a memory card is loaded into the drive 31 to write or read data on the removable storage medium 32.

For example, a computer program read from the removable storage medium 32 is installed into the storage unit 19 as required, or data processed by the CPU 11 is stored on the removable storage medium 32. As a matter of course, the drive 31 may be a recording and reproducing drive for a removable storage medium 32 other than a memory card, the removable storage medium 32 being a magnetic disk, an optical disk, a magneto-optical disk, or the like.

It is to be noted that, for the functions of the information processing device 1 as an embodiment, there is no limitation to forming the single information processing device (computer device) having the hardware configuration as in FIG. 4, but a plurality of computer devices may be formed into a system. The plurality of computer devices may be formed into a system by a LAN (Local Area Network) or the like, or may be arranged at remote places with a VPN (Virtual Private Network) or the like with use of the Internet or the like. The plurality of computer devices may include a computer device that can be used by a cloud computing service.

1-4. Measuring Method as First Embodiment

Figure 5:
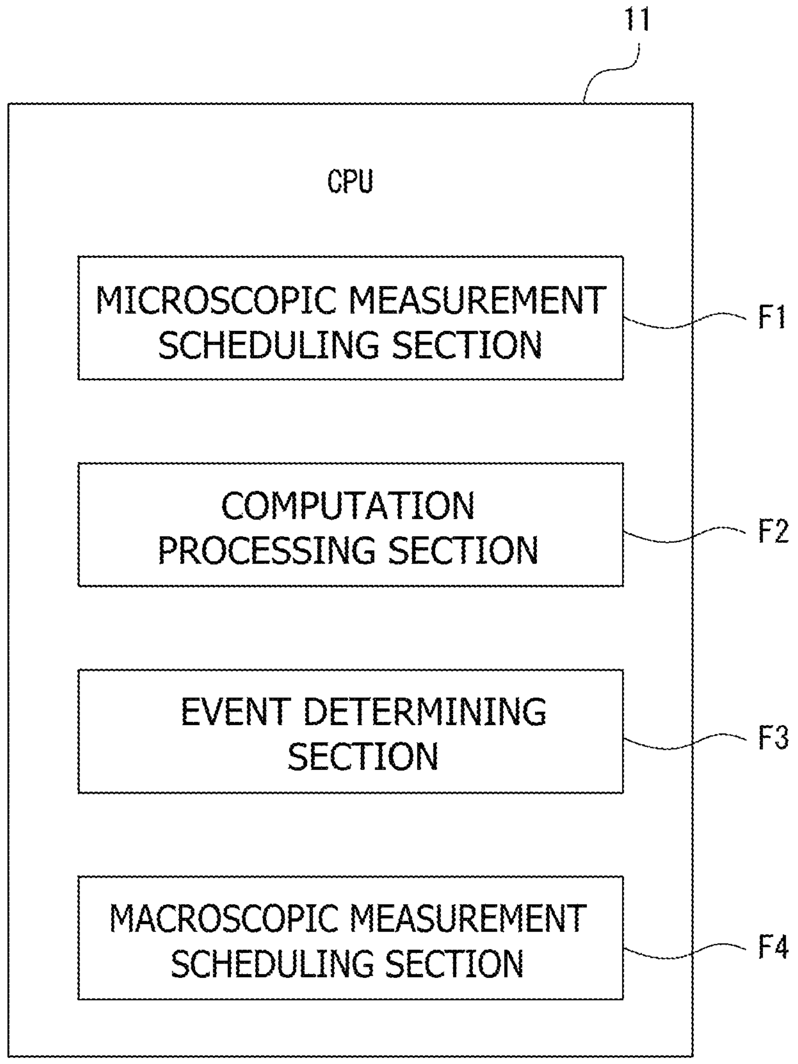
FIG. 5 is a functional block diagram illustrating functions as the first embodiment which functions are possessed by the information processing device.

FIG. 5 is a functional block diagram illustrating functions as the first embodiment which functions are possessed by the CPU 11 in the information processing device 1.

As illustrated in the figure, the CPU 11 includes a microscopic measurement scheduling section F1, a computation processing section F2, an event determining section F3, and a macroscopic measurement scheduling section F4.

In the following, these functions possessed by the CPU 11 will be described with reference to FIGS. 6 to 8.

Figure 6:
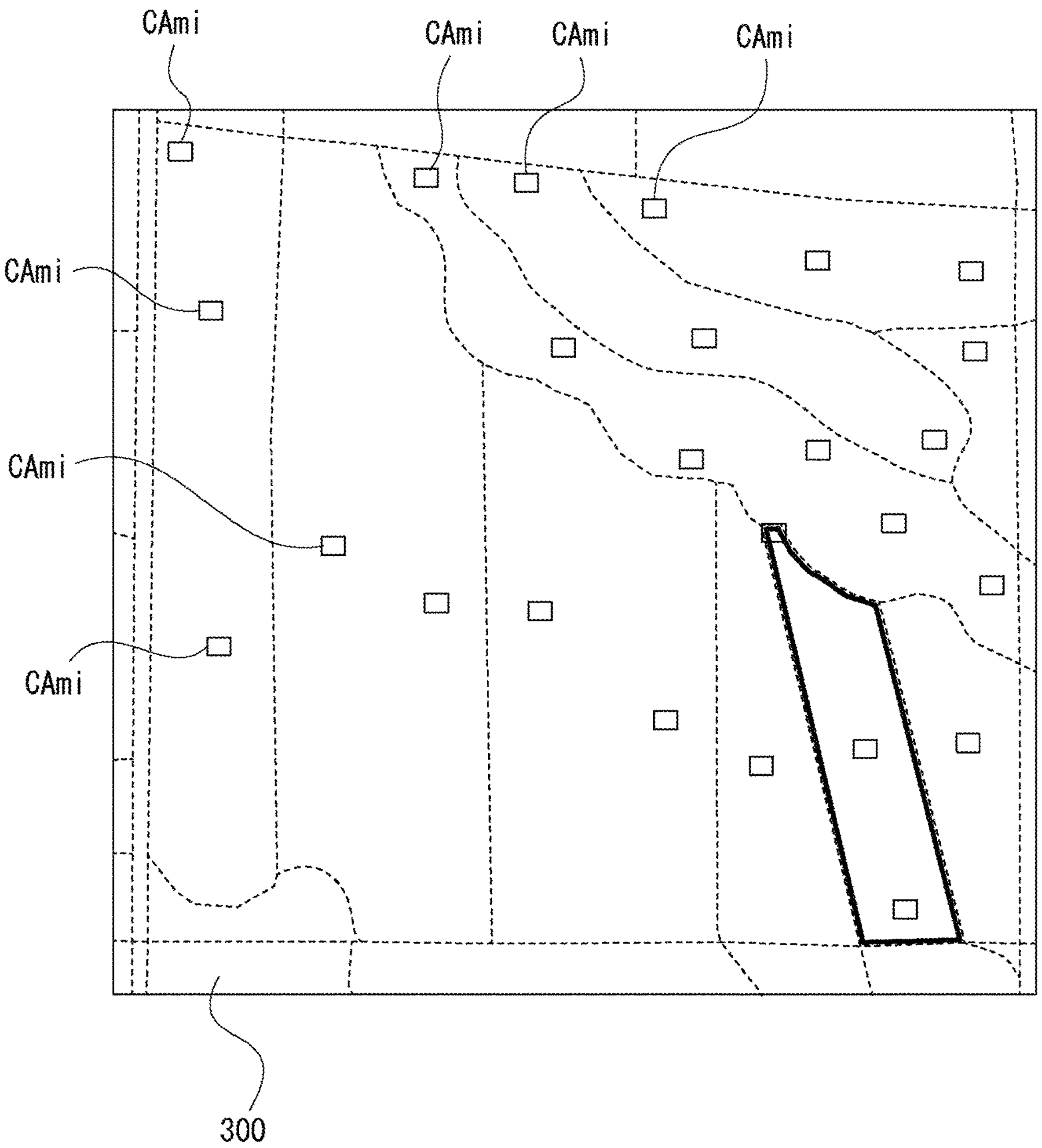
FIG. 6 is a diagram illustrating a distribution of cultivated varieties indicated by a field map and candidate areas for microscopic measurement areas, the candidate areas being set for the field.
Figure 7:
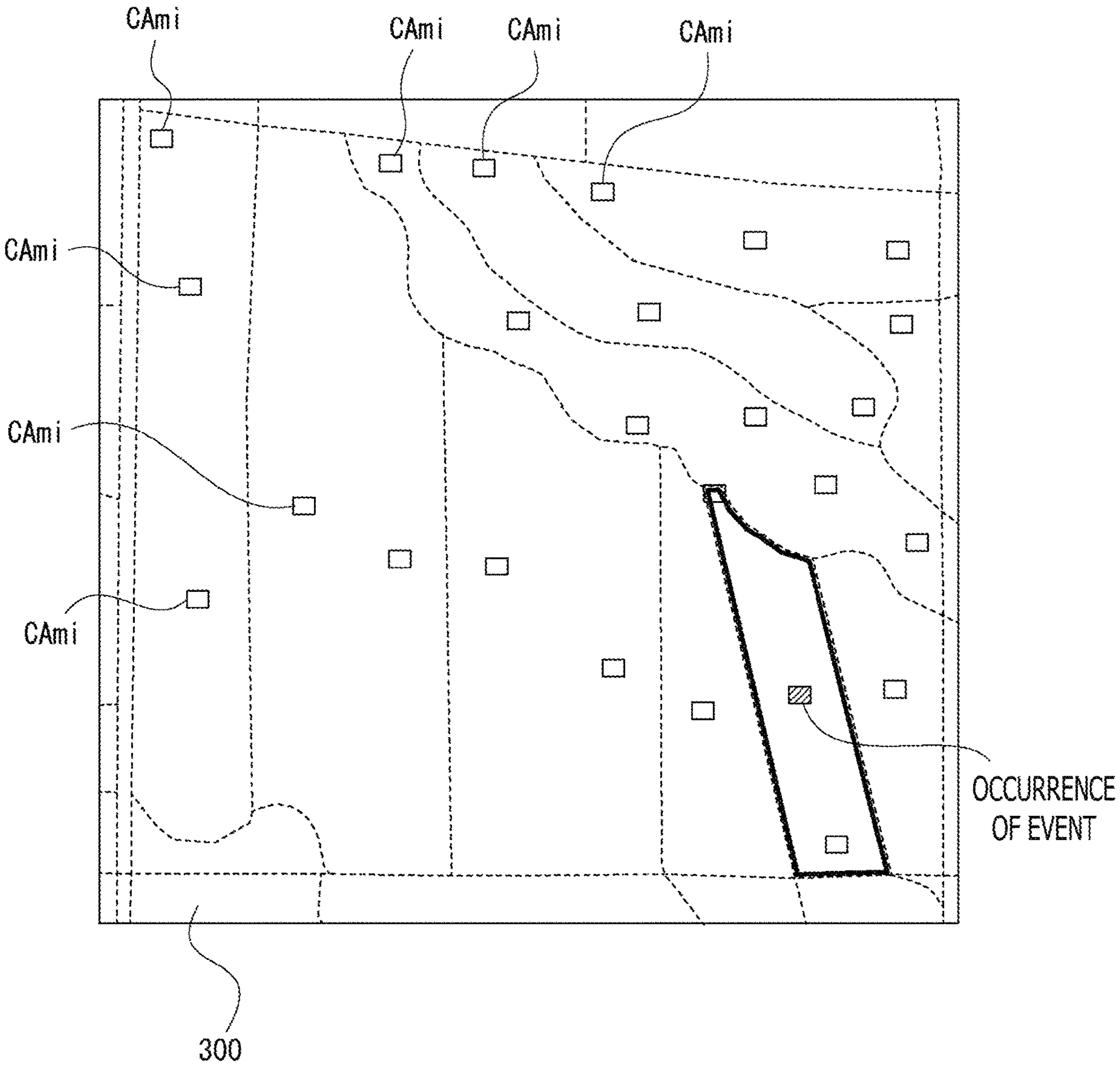
FIG. 7 is a diagram illustrating an area in which a microscopic measurement is performed.

FIG. 6 illustrates a distribution of cultivated varieties indicated by a field map of the field 300 as the measurement target 4 and candidate areas CAmi (indicated by quadrangular marks in the figure) for microscopic measurement areas Ami, the candidate areas CAmi being set for the field 300.

Here, the field map is a map indicating a variety distribution of cultivated plants in the field. In the figure, boundary lines between areas of different cultivated plants are represented by dotted lines.

In the following, the areas thus demarcated according to distinctions between the cultivated varieties will be described as "variety areas."

In addition, a microscopic measurement area Ami means an area in which the microscopic measuring unit 2 performs a measurement in one unit. A range (size) of the microscopic measurement area Ami is the same as the microscopic measurement range RZ2 described with reference to FIG. 1.

In the present example, a plurality of candidate areas CAmi for microscopic measurement areas Ami is set in advance for the field 300. The figure illustrates an example in which one or a plurality of candidate areas CAmi is set for each variety area.

The measurement system in the present example sets, as microscopic measurement areas Ami, candidate areas CAmi determined by scheduling from among the plurality of candidate areas CAmi thus set in the field 300, and performs measurement by the microscopic measuring unit 2.

The microscopic measurement scheduling section F1 illustrated in FIG. 5 performs scheduling for measurement by the microscopic measuring unit 2. The scheduling in this case is a concept including not only determining temporal elements of a schedule such as an execution timing of the schedule but also determining locational elements of the schedule such as areas in which to execute the schedule.

Specifically, for microscopic measurement to be performed by the microscopic measuring unit 2, the microscopic measurement scheduling section F1 in the present example sets the microscopic measurement areas Ami from the candidate areas CAmi, sets a time zone in which to perform the measurement in the set microscopic measurement areas Ami, and sets execution intervals of the microscopic measurement.

In the present example, as the microscopic measurement, measurement of a plurality of microscopic measurement areas Ami is performed in one flight of the flight vehicle 200. Therefore, the setting of the microscopic measurement areas Ami is processing of selecting and setting a plurality of microscopic measurement areas Ami from among the candidate areas CAmi, and the setting of the execution intervals of the microscopic measurement is processing of setting the execution intervals of a series of measurement operations performed for the plurality of microscopic measurement areas Ami in one flight of the flight vehicle 200 when the series of measurement operation is regarded as one set.

Here, with regard to the scheduling by the microscopic measurement scheduling section F1, the microscopic measurement areas Ami may be set automatically from the field map, or may be set automatically from a soil map or the like on the basis of the diversity of each location in the field 300.

Here, the soil map means a map indicating a distribution of soil properties in the field.

In addition, in the scheduling by the microscopic measurement scheduling section F1, the number of microscopic measurement areas Ami to be set can also be set in consideration of a flyable time or the like of the flight vehicle 200 as a drone or the like.

Incidentally, with regard to the microscopic measurement scheduling, it is possible to determine, on the basis of operating input of the user, schedule elements, specifically a part or the whole of locational schedule elements as settings of the microscopic measurement areas Amis in which to perform the microscopic measurement and temporal schedule elements such as the measurement execution time zone and the execution intervals of the measurement.

Here, in the above description, an example has been illustrated in which the microscopic measurement areas Ami in which to actually perform the measurement by the microscopic measuring unit 2 are selected from among the candidate areas CAmi determined in advance. However, this is a mere example. As a matter of course, it is possible to determine the microscopic measurement areas Ami at desired locations in the field 300 without setting the candidate areas CAmi.

In FIG. 5, the computation processing section F2 performs computation that obtains an evaluation value of the measurement target 4 on the basis of measurement results obtained by the microscopic measuring unit 2 and the macroscopic measuring unit 3.

Specifically, the computation processing section F2 in the present example performs a computation that obtains at least a PRI as the evaluation value of a plant cultivated in the field 300 as the measurement target 4.

Here, the PRI is obtained as follows on the basis of captured images of two wavelengths, that is, a wavelength $\lambda$=531 nm and a wavelength $\lambda$=570 nm which captured images are obtained by the multi-spectrum camera as the imaging device 250 (letting $\lambda_{531}$ and $\lambda_{570}$ be the respective captured images).

$PRI=(\lambda_{531}-\lambda_{570})/(\lambda_{531}+\lambda_{570})$

The evaluation value of the plant which evaluation value is obtained by the computation processing section F2 is not limited to the PRI. For example, the above-described NDVI or the like can be cited.

The evaluation value calculated by the computation processing section F2 on the basis of the measurement result of the macroscopic measuring unit 3 is used in macroscopic analysis processing of the measurement target 4 which analysis processing is performed by the CPU 11, for example.

In addition, in the present example, the evaluation value calculated by the computation processing section F2 on the basis of the measurement result of the microscopic measuring unit 2, specifically the above-described PRI is used in determination processing by the event determining section F3.

The event determining section F3 determines occurrence or nonoccurrence of an event on the basis of the measurement result of the microscopic measuring unit 2. Specifically, occurrence or nonoccurrence of an event in a microscopic measurement area Ami is determined on the basis of the PRI calculated by the computation processing section F2 on the basis of the measurement result of the microscopic measuring unit 2. Here, suppose that the event is an abnormal state related to an amount of water content of the plant.

In the following, such an abnormal state related to the amount of water content of the plant will be described as a "water stress state."

When the amount of water content of the plant becomes insufficient, the stomata of the plant are closed in order to prevent transpiration of water. When the stomata are closed, carbon dioxide necessary for photosynthesis cannot be taken in. The above-described PRI is known as an index that can measure the reaction of the plant at this time. Specifically, the PRI can be regarded as an optical measurement of a degree of epoxidation/deepoxidation in the xanthophyll cycle in the plant.

When a degree of water stress is increased in the plant, the value of the PRI tends to be correspondingly decreased. Therefore, the event determining section F3 in the present example determines whether or not the value of the PRI is equal to or less than a predetermined threshold value as a determination of occurrence or nonoccurrence of the water stress state. That is, a determination result indicating that the water stress state has occurred is obtained when the value of the PRI is equal to or less than the threshold value. Otherwise, a determination result indicating that the water stress state has not occurred is obtained.

In the present example, because measurement of a plurality of microscopic measurement areas Ami is performed according to the microscopic measurement scheduling described above, the event determining section F3 determines occurrence or nonoccurrence of the event (water stress state) for each microscopic measurement area Ami.

In a case where the event determining section F3 determines that the event has occurred, the macroscopic measurement scheduling section F4 performs scheduling for measurement by the macroscopic measuring unit 3.

Here, suppose that measurement of all of candidate areas CAmi within a variety area indicated by a thick line in FIG. 6 as microscopic measurement areas Ami is performed as a measurement by the microscopic measuring unit 2 according to scheduling by the microscopic measurement scheduling section F1. Then, suppose that, as illustrated in FIG. 7, the event determining section F3 obtains a determination result indicating that the water stress state as an event has occurred in one microscopic measurement area Ami within the variety area.

In this case, the macroscopic measurement scheduling section F4 performs scheduling for measurement by the macroscopic measuring unit 3 such that the macroscopic measuring unit 3 performs measurement while an area having relation to the microscopic measurement area Ami in which the event is determined to have occurred is set as a macroscopic measurement area Amc.

Figure 8:
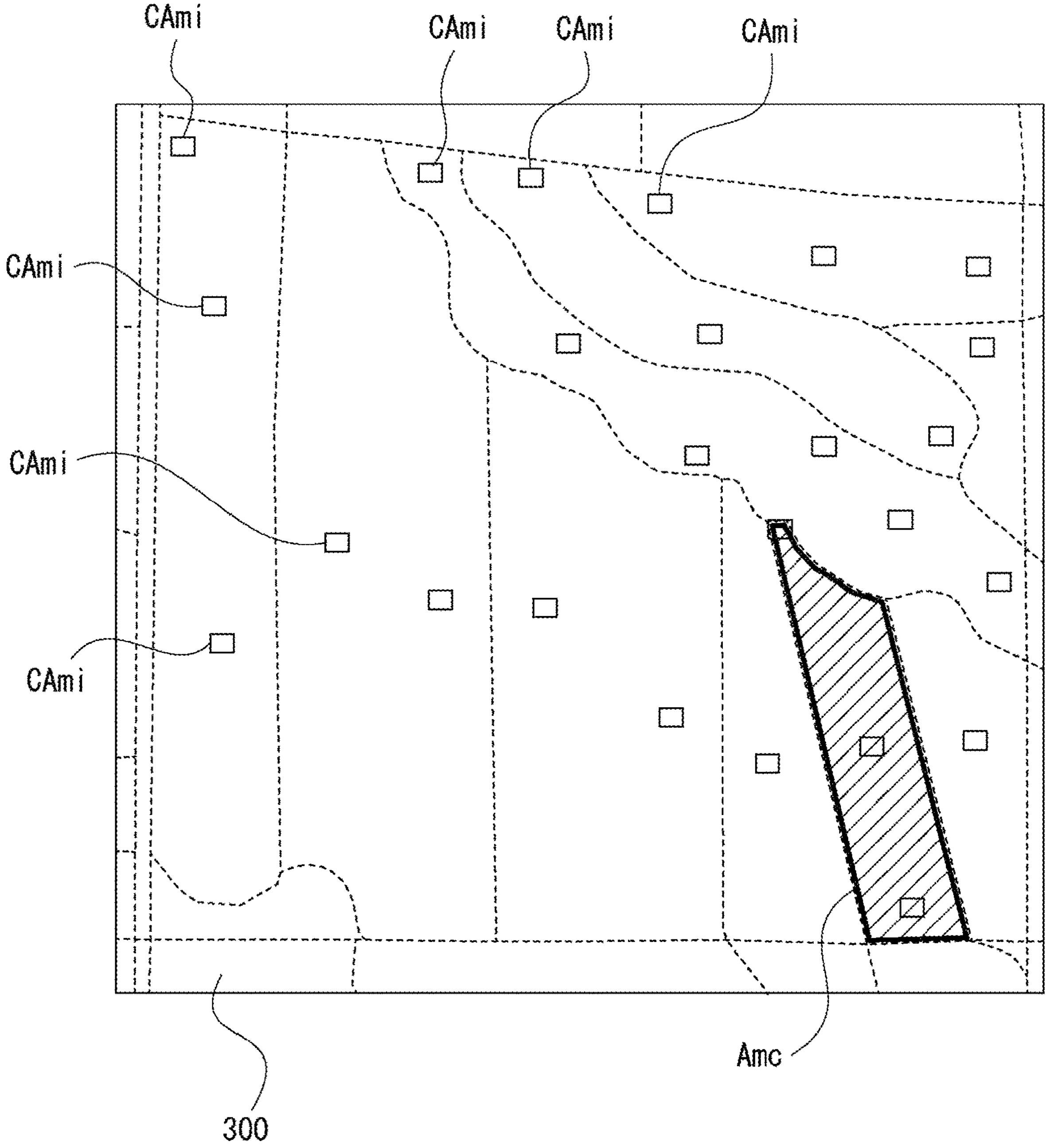
FIG. 8 is a diagram illustrating an area in which an event is determined to have occurred.

Specifically, FIG. 8 illustrates an example in which a variety area including the microscopic measurement area Ami in which the event is determined to have occurred in the field 300 as the measurement target 4 is set as the macroscopic measurement area Amc.

Incidentally, in the following, the microscopic measurement area Ami in which the event is determined to have occurred will be described as an "event occurrence microscopic area."

Here, the area having relation to the event occurrence microscopic area is not limited to the variety area including the event occurrence microscopic area as described above.

For example, instead of the entire variety area including the event occurrence microscopic area, only an area having a soil property similar to that of the event occurrence microscopic area from the soil map in the variety area may be set as the macroscopic measurement area Amc.

Alternatively, without being limited to the inside of the variety area, an area having a soil property similar to that of the event occurrence microscopic area may be set as the macroscopic measurement area.

Thus, in the present embodiment, a partial specific area having relation to the event occurrence microscopic area within the field 300, rather than the entire field 300, is set as the macroscopic measurement area Amc.

In addition, the macroscopic measurement scheduling section F4 also performs temporal scheduling of the macroscopic measurement as the scheduling for the macroscopic measurement. In the present embodiment, performing macroscopic analysis with regard to the water stress state is set as an objective, and therefore, the macroscopic measurement is expected to be performed at a timing in which the water stress state has occurred in the macroscopic measurement area Amc.

Here, the water stress state tends to occur immediately before irrigation for the plant is performed. Therefore, even when a flight for the macroscopic measurement is started immediately according to determination of the occurrence of the water stress state in the microscopic measurement area Ami, there is a possibility that the macroscopic measurement area Amc may be reached at a timing after the irrigation. There is thus a fear of being unable to perform macroscopic analysis with regard to the water stress state appropriately.

Therefore, an execution timing of the macroscopic measurement is determined according to an irrigation timing after the irrigation at a time of the determination of the occurrence of the water stress state.

Figure 9:
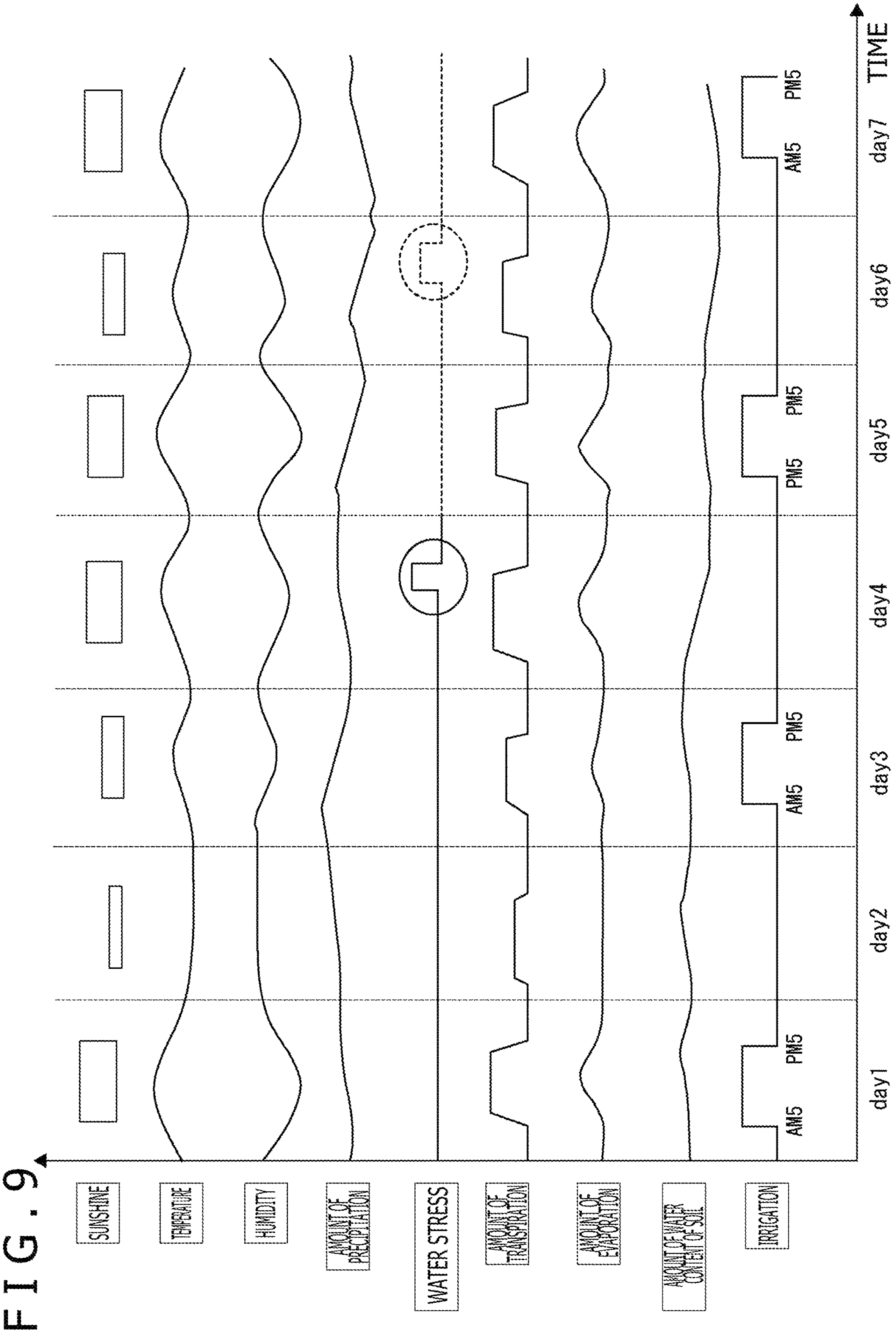
FIG. 9 is a diagram for considering a method of deciding a macroscopic measurement execution timing.

Referring to FIG. 9, consideration will be given to a method of determining the execution timing of the macroscopic measurement.

FIG. 9 illustrates observation results with regard to weather conditions and the states of the plant and the soil when the water stress state occurs. Specifically, FIG. 9 schematically illustrates each of a sunshine duration, temperature, humidity, an amount of precipitation, an amount of transpiration (amount of transpiration of water in the plant), an amount of evaporation (amount of evaporation of the water content of the soil), an amount of soil water content, and the presence or absence of irrigation in a period of a few days (day 1 to day 7) including a day when the water stress state occurs (day 5) and preceding and succeeding days.

The water stress state basically tends to occur as the amount of water content of the soil is decreased due to a small amount of precipitation, consecutive days with a large amount of sunshine, or the like. In addition, because the amount of water content of the soil is decreased when a time passes from an irrigation, the water stress state tends to occur immediately before an irrigation.

It is understood from the above that timing in which to perform the macroscopic measurement, that is, a timing in which the water stress state occurs next can be predicted on the basis of weather forecast information and irrigation schedule information indicating an irrigation schedule.

FIG. 9 illustrates an example in which the water stress state is predicted to occur next at a timing indicated by a broken line circular mark.

As temporal scheduling for the macroscopic measurement, the macroscopic measurement scheduling section F4 in the present example performs processing of predicting a timing in which the water stress state will occur next in the macroscopic measurement area Amc on the basis of the weather forecast information obtained from the Internet and the irrigation schedule information stored in a storage device readable by the CPU 11, the storage device being the storage unit 19 or the like, for example, and the macroscopic measurement scheduling section F4 sets a scheduled measurement timing for the macroscopic measurement area Amc on the basis of the predicted timing.

In the present example, the CPU 11 makes the macroscopic measuring unit 3 perform measurement operation according to schedule information determined by the scheduling processing of the macroscopic measurement scheduling section F4 as described above. Specifically, in the present example, the control unit 22 illustrated in FIG. 3 is given an instruction to perform measurement targeted at the macroscopic measurement area Amc determined by the scheduling processing in the scheduled measurement timing determined by the scheduling processing.

When the macroscopic measuring unit 3 performs measurement targeted at the macroscopic measurement area Amc according to the instruction, the information processing device 1 receives a result of measurement of the macroscopic measurement area Amc from the macroscopic measuring unit 3.

The CPU 11 performs analysis processing of the macroscopic measurement area Amc on the basis of information regarding the thus received result of measurement of the macroscopic measurement area Amc. In this analysis processing, the CPU 11, for example, performs processing of calculating an evaluation value such as the PRI by a function of the computation processing section F2 described above, and performs analysis of the macroscopic measurement area Amc on the basis of the calculated evaluation value.

Incidentally, the analysis in this case may perform processing or the like of detecting a location where the water stress state has occurred and a location where the water stress state has not occurred in the macroscopic measurement area Amc.

On the basis of such a detection result, the user can take a measure such, for example, as increasing an amount of irrigation for an area in which the water stress state has occurred (for example, increasing the amount of irrigation in one time of irrigation or increasing the frequency of irrigation) while not changing the amount of irrigation for an area in which the water stress state has not occurred.

Thus, the user refers to a result of the analysis by the information processing device 1 in reviewing and improving a method of cultivating the plant and so forth.

1-5. Processing Procedure

Next, referring to a flowchart of FIGS. 10 to 12, description will be made of an example of a specific processing procedure for implementing a measuring method as the first embodiment described above.

Figure 10:
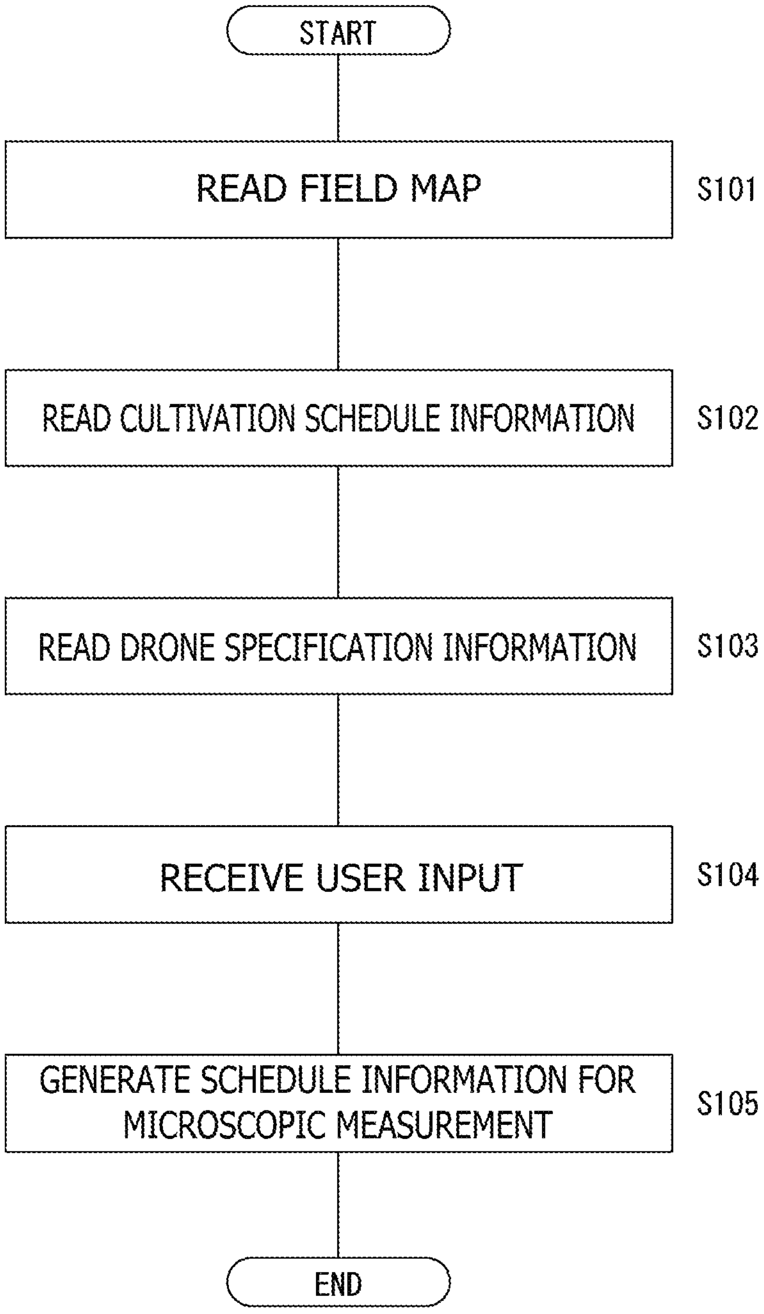
FIG. 10 is a flowchart illustrating scheduling processing for microscopic measurement in the first embodiment.
Figure 11:
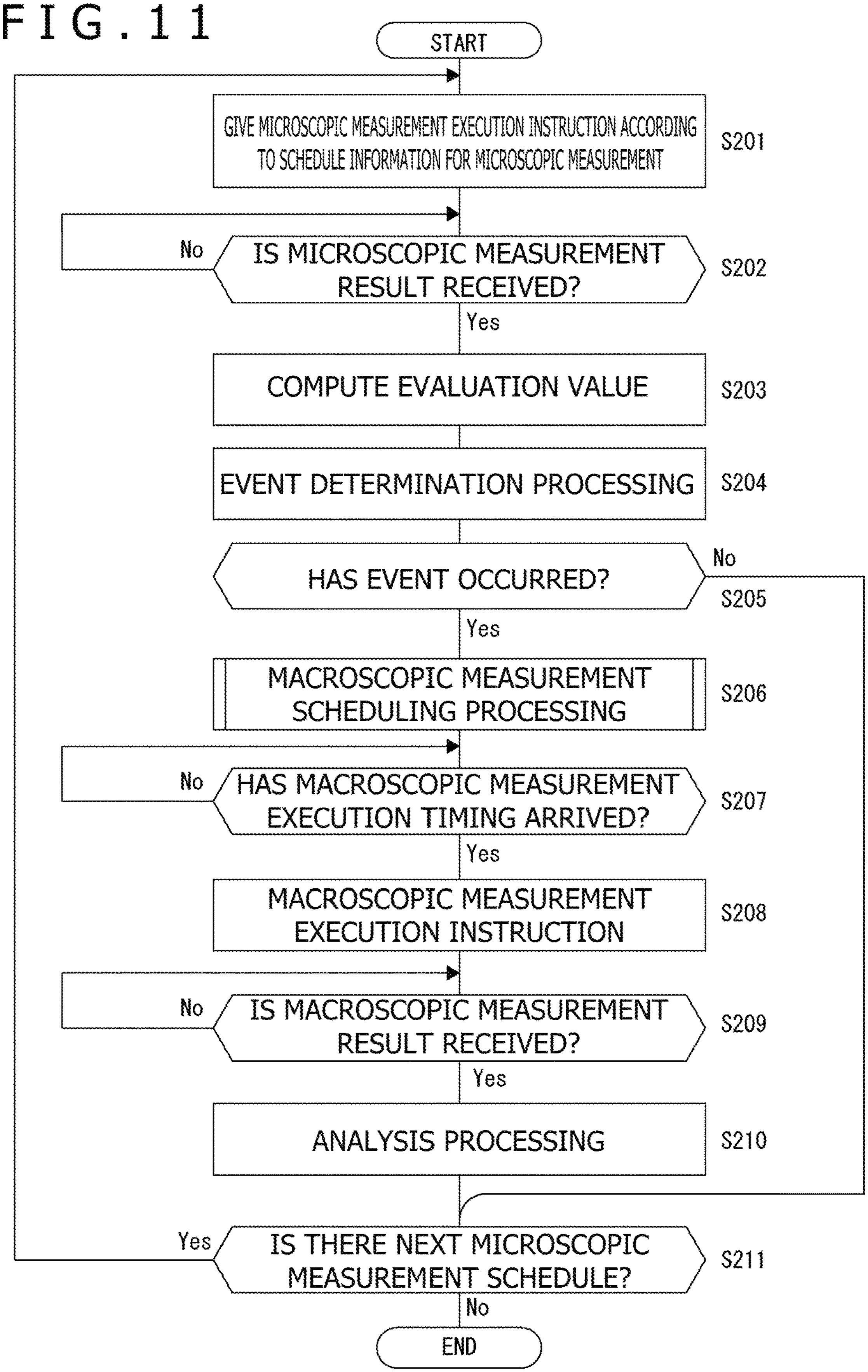
FIG. 11 is a flowchart of processing for implementing event determination and macroscopic measurement in the first embodiment.
Figure 12:
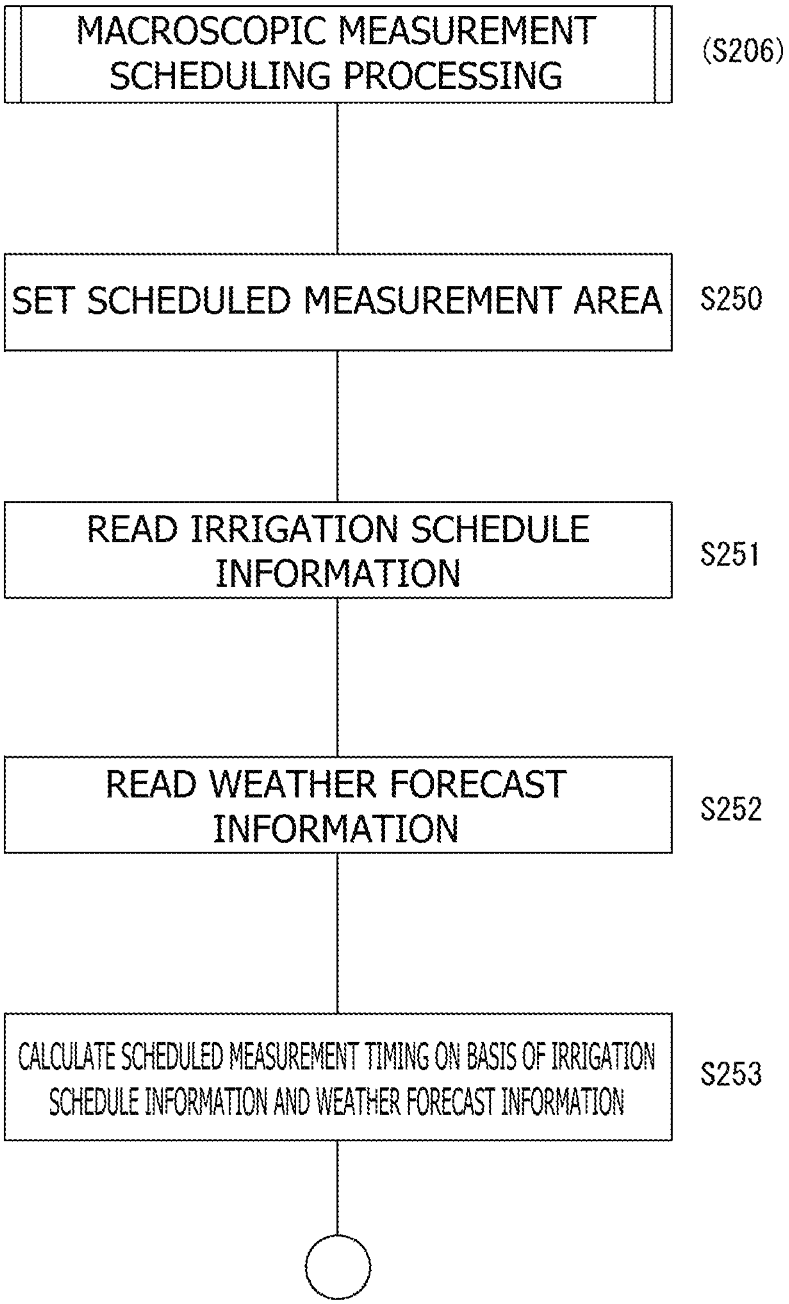
FIG. 12 is a flowchart of macroscopic measurement scheduling processing in the first embodiment.

Incidentally, processing illustrated in these FIGS. 10 to 12 is performed by the CPU 11 according to a program stored in the ROM 12 or the storage unit 19.

FIG. 10 is a flowchart of scheduling processing for microscopic measurement, that is, processing corresponding to the microscopic measurement scheduling section F1 described above.

Here, an example is assumed in which the candidate areas CAmi described above are set for the microscopic measurement. In the present example, suppose that the candidate areas CAmi are areas manually set by the user.

First, the CPU 11 reads the field map in step S101, and reads cultivation schedule information in next step S102. The cultivation schedule information is information indicating a cultivation schedule of the plant in each area of the field 300, such, for example, as information indicating a scheduled cultivation period of the plant in each variety area described above.

In addition, in step S103 following step S102, as processing of reading drone specification information, the CPU 11 performs processing of reading specification information (for example, information regarding the flyable time or the like) of the drone as the flight vehicle 200. Further, in next step S104, as user input reception processing, the CPU 11 receives operating input information from the user.

Then, in step S105 following step S104, the CPU 11 generates schedule information for microscopic measurement.

In step S105, the CPU 11 performs processing of selecting a microscopic measurement area Ami from among the candidate areas CAmi on the basis of the read field map and the read cultivation schedule information. Basically, for example, a candidate area CAmi that is in a variety area for cultivating a specific kind of plant and in which the plant is being cultivated is selected as the microscopic measurement area Ami. As described earlier, in the present example, a plurality of microscopic measurement areas Ami is selected in scheduling of the microscopic measurement.

At this time, in a case where there is an operating input for specifying a specific candidate area CAmi from the user in step S104, the CPU 11 also selects the candidate area CAmi as a microscopic measurement area Ami.

In addition, on the basis of the drone specification information obtained in step S103, the CPU 11 determines whether or not all of the selected microscopic measurement areas Ami can be measured in one flight in terms of specifications of the flight vehicle 200. In a case where the CPU 11 determines that not all of the selected microscopic measurement areas Ami can be measured in one flight, the CPU 11 performs processing of adjusting the number of microscopic measurement areas Ami selected such that all of the selected microscopic measurement areas Ami can be measured.

In addition, in step S105, the CPU 11 also performs processing of setting measurement execution intervals, that is, execution intervals of a measurement operation of measuring all of the selected microscopic measurement areas Ami in one flight. The execution intervals may be set on the basis of an operating input of the user. Alternatively, the execution intervals may automatically be set by the CPU 11 according to a purpose of the measurement or the like.

In addition, in the present example, with regard to the schedule information for the microscopic measurement, an execution period of the microscopic measurement is also set. The execution period in this case refers to a repetition period of the microscopic measurement, that is, a period during which repetition of the microscopic measurement according to the above-described execution intervals is continued.

The CPU 11 ends the series of processing illustrated in FIG. 10 according to completion of the processing of step S105.

Incidentally, the scheduling of the microscopic measurement may also be performed on the basis of actual yield result information of each variety area.

FIG. 11 is a flowchart of processing for implementing the event determination and the macroscopic measurement.

In FIG. 11, the CPU 11 in step S201 gives a microscopic measurement execution instruction according to the schedule information for the microscopic measurement. That is, according to the schedule information generated in step S105 in FIG. 10, the control unit 22 mounted in the flight vehicle 200 as a drone is given an instruction to perform a measurement operation as the microscopic measuring unit 2. This instruction is an instruction to perform an operation of measuring the plurality of selected microscopic measurement areas Ami in one flight.

In step S202 following step S201, the CPU 11 waits to receive microscopic measurement results. That is, waiting is performed to receive the measurement results of the respective microscopic measurement areas Ami which measurement results are obtained in the single measurement operation for which the instruction is given in step S201.

In a case where the microscopic measurement results are received, the CPU 11 performs evaluation value computation processing in step S203. This computation processing is processing of computing an evaluation value for determining occurrence or nonoccurrence of an event. Specifically, in the present example, the computation processing is processing of performing a computation that obtains the PRI described above.

In step S204 following step S203, the CPU 11 performs processing of determining occurrence or nonoccurrence of the water stress state as event determination processing. Specifically, the present example determines occurrence or nonoccurrence of the water stress state, that is, determines whether or not the PRI calculated in step S203 is equal to or less than a predetermined threshold value for each microscopic measurement area Ami whose microscopic measurement result is received.

In step S205 following step S204, the CPU 11 performs processing of determining whether or not the event has occurred. That is, processing is performed which determines whether or not there is a microscopic measurement area Ami in which the occurrence of the water stress state is observed as a result of the determination processing in step S204.

In a case where there is no microscopic measurement area Ami in which the occurrence of the water stress state is observed and therefore a determination result indicating that the event has not occurred is obtained in step S205, the CPU 11 advances the processing to step S211, where the CPU 11 determines whether or not there is a next microscopic measurement schedule. This processing is processing of determining whether or not the above-described execution period (see S105) of the microscopic measurement is yet to be expired.

In a case where the CPU 11 determines that there is a next microscopic measurement schedule in step S211, the CPU 11 returns to step S201.

Thus, in a case where the event as the water stress state has not occurred, neither of the scheduling of the macroscopic measurement and the macroscopic measurement is performed.

On the other hand, in a case where there is a microscopic measurement area Ami in which the occurrence of the water stress state is observed and therefore a determination result indicating that the event has occurred is obtained in step S205, the CPU 11 advances the processing to step S206, where the CPU 11 performs macroscopic measurement scheduling processing.

FIG. 12 is a flowchart of the macroscopic measurement scheduling processing in step S206.

In FIG. 12, the CPU 11 sets a scheduled measurement area in step S250. That is, the microscopic measurement area Ami described above is set.

As described earlier, in the present embodiment, in a case where the event has occurred, a partial specific area having relation to the event occurrence microscopic area within the field 300, not to the entire field 300, is set as the macroscopic measurement area Amc. Specifically, the CPU 11 refers to the field map, and sets the macroscopic measurement area Amc (scheduled measurement area) on the basis of information regarding a cultivated variety in the event occurrence microscopic area. For example, among variety areas in which the same variety of plant as in the event occurrence microscopic area is cultivated, a variety area including the event occurrence microscopic area may be set as the macroscopic measurement area Amc.

Alternatively, the CPU 11 refers to the soil map, and sets the macroscopic measurement area Amc on the basis of information regarding the soil property of the event occurrence microscopic area. For example, among areas having a similar soil property to that of the event occurrence microscopic area, an area including the event occurrence microscopic area may be set as the macroscopic measurement area Amc.

Incidentally, as illustrated earlier, various methods for setting the scheduled measurement area of the macroscopic measurement are conceivable, such, for example, as, instead of setting the entire variety area including the event occurrence microscopic area, setting, as the macroscopic measurement area Amc, only an area having a similar soil property to that of the event occurrence microscopic area from the soil map in the variety area.

In step S251 following step S250, the CPU 11 reads the irrigation schedule information. Further, in next step S252, the CPU 11 reads the weather forecast information.

Then, in step S253 following step S252, the CPU 11 performs processing of calculating a scheduled measurement timing on the basis of the irrigation schedule information and the weather forecast information. Incidentally, as for the scheduled measurement timing of the macroscopic measurement, it suffices to determine the scheduled measurement timing as a timing in which the water stress state is predicted to occur next, as described earlier. The method of predicting the timing is already described, and therefore, a repeated description thereof will be avoided.

In FIG. 11, according to completion of the macroscopic measurement scheduling processing in step S206 as described above, the CPU 11 advances the processing to step S207.

In step S207, the CPU 11 waits until a macroscopic measurement execution timing arrives. That is, waiting is performed for the arrival of the scheduled measurement timing indicated by the schedule information for the macroscopic measurement which schedule information is generated in step S206.

When the macroscopic measurement execution timing arrives, the CPU 11 proceeds to step S208, where the CPU 11 gives the control unit 22 an instruction to perform a measurement operation targeted at the scheduled measurement area (macroscopic measurement area Amc) indicated by the schedule information for the macroscopic measurement as a macroscopic measurement execution instruction.

In step S209 following step S208, as processing of waiting to receive a macroscopic measurement result, the CPU 11 waits to receive a measurement result of the macroscopic measurement performed according to the instruction in step S208.

Then, in a case where the CPU 11 has received the macroscopic measurement result, the CPU 11 performs analysis processing in step S210. That is, in the present example, processing of calculating an evaluation value such as the PRI is performed, and analysis with regard to the macroscopic measurement area Amc is performed on the basis of the calculated evaluation value. Incidentally, a specific example of the analysis is already described, and therefore, a repeated description thereof will be avoided.

According to completion of the analysis processing in step S210, the CPU 11 advances the processing to step S211 described earlier, where the CPU 11 determines whether or not there is a next microscopic measurement schedule. As described earlier, when there is a next microscopic measurement schedule, the CPU 11 returns to step S201. Repetitive microscopic measurements are thereby made possible.

In a case where the CPU 11 determines in step S211 that there is no next microscopic measurement schedule, the CPU 11 ends the series of processing illustrated in FIG. 11.

Incidentally, with regard to the macroscopic measurement scheduling described with reference to FIG. 12, the water stress state basically tends to occur immediately before an irrigation, but in actuality, the water stress state occurs when various conditions coincide with each other. Thus, various methods may be adopted to achieve an improvement in accuracy of prediction. For example, a timing in which the water stress state occurs next may be predicted by using AI (artificial intelligence) machine-learned with observation data at times of actual occurrence of the water stress state (which observation data may, for example, be observation data related to weather conditions, an amount of water content of the soil, and irrigation as illustrated in FIG. 9) as input data for learning.

Alternatively, the timing in which the water stress state occurs next may be predicted by making a rule-based estimation of a condition under which water stress occurs on the basis of the observation data at the times of actual occurrence of the water stress state, and predicting a timing in which the estimated condition is likely to occur on the basis of forecast information regarding weather conditions and irrigation.

In addition, the prediction of the timing in which the water stress state occurs next can also be performed as a regressive prediction, that is, a prediction based on cycles of occurrence of the water stress state which cycles are obtained from measurement results in the past.

In addition, while the above description illustrates an example in which occurrence or nonoccurrence of the water stress state is determined on the basis of the PRI, occurrence or nonoccurrence of the water stress state can also be determined on the basis of temperature information of the plant. In this case, the imaging of a thermal image (infrared image) is performed as the measurement.

As described earlier, the plant prevents transpiration of water by closing stomata thereof in the water stress state. At this time, as an amount of transpiration from leaves is reduced, a temperature decrease due to the heat of vaporization is also reduced, and consequently the temperature of the plant tends to rise. Hence, it is possible to determine that the plant is in the water stress state when the temperature of the plant is equal to or higher than a predetermined threshold value.

In addition, while the above description cites an example in which the microscopic measuring unit 2 is in a form of the flight vehicle 200 such as a drone, the form of the microscopic measuring unit 2 may be the form of a self-movable device other than the flight vehicle 200, the self-movable device being a self-propelled robot or the like. Alternatively, the microscopic measurement may be a manual traveling measurement (manual traveling measurement using a portable sensor).

In addition, it is possible to adopt a configuration in which a part or the whole of each processing element described in the foregoing, specifically the microscopic measurement scheduling processing, the evaluation value computation processing based on the measurement results of the microscopic measurement and the macroscopic measurement, the macroscopic measurement scheduling processing, and the analysis processing based on the macroscopic measurement result is implemented on the device side having the sensor for measurement (sensor unit 20).

2. Second Embodiment

2-1. Microscopic Measuring Unit and Macroscopic Measuring Unit in Second Embodiment A second embodiment will next be described.

The second embodiment is an embodiment assuming that the microscopic measuring unit 2 is configured as a fixed point measuring unit fixedly installed in the field 300 rather than as a moving body.

Incidentally, in the following description, parts similar to the already described parts are identified by the same reference signs and the same step numbers, and description thereof will be omitted.

Figure 13:
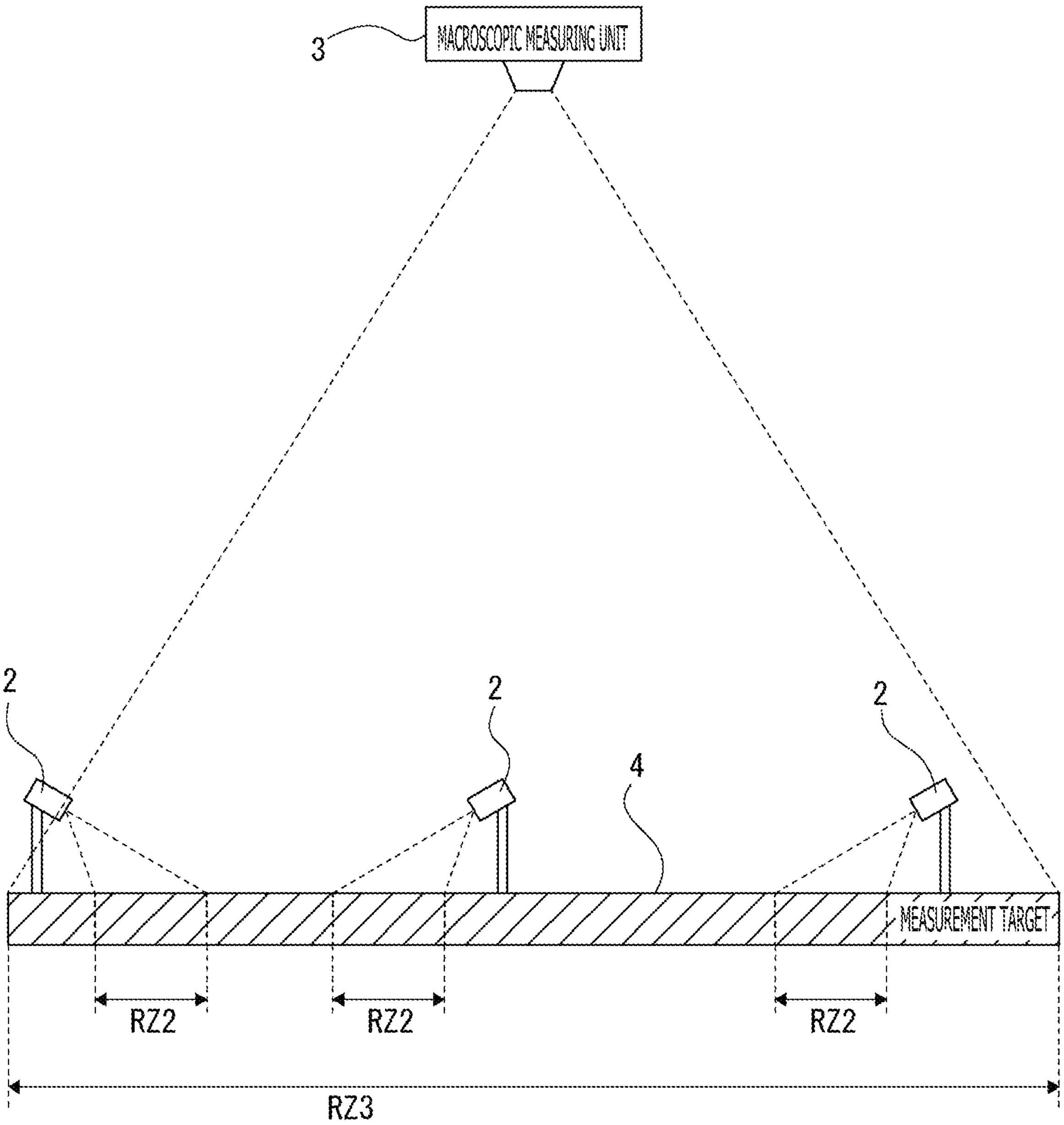
FIG. 13 is a diagram of assistance in explaining a macroscopic measuring unit and a microscopic measuring unit in a second embodiment.

FIG. 13 is a diagram of assistance in explaining the microscopic measuring unit 2 and the macroscopic measuring unit 3 in the second embodiment.

As illustrated in the figure, the microscopic measuring unit 2 as the fixed point measuring unit is installed at a plurality of positions in the measurement target 4 as the field 300. For example, these microscopic measuring units 2 as the fixed point measuring units are installed at respective predetermined positions in the field 300 so as to have candidate areas CAmi as illustrated in FIG. 6 as respective measurement target ranges.

Incidentally, also in this case, relation between the microscopic measurement range RZ2 and the macroscopic measurement range RZ3 is similar to that in the case of the first embodiment.

Because the microscopic measuring units 2 in this case are configured as the fixed point measuring units, the microscopic measuring units 2 are easily increased in the frequency of measurement, that is, the temporal resolution of measurement (because a time for a flight is not necessary) as compared with the case where the microscopic measuring unit 2 is configured as a flight measuring unit as in the first embodiment.

Here, in the second embodiment, not only analysis based on the PRI described in the first embodiment but also analysis based on spectral reflectance is performed as the analysis processing based on the macroscopic measurement result, that is, macroscopic analysis processing of the measurement target 4.

The spectral reflectance refers to the reflectance of the plant for irradiation light from a light source (the sun in this case) with respect to a target wavelength (λ). Specifically, the spectral reflectance R(λ) with respect to the target wavelength (λ) is obtained by detecting the irradiation light I(λ) from the light source and reflected light E (λ) from the plant (for example, leaves), and dividing the reflected light E(λ) by the irradiation light I(λ). That is, "$R(\lambda)=I^{-1}(\lambda)E(\lambda)$."

In order to enable the measurement of the spectral reflectance R(λ) as described above, the macroscopic measuring unit 3 in this case is provided with a corresponding sensor.

Figure 14:
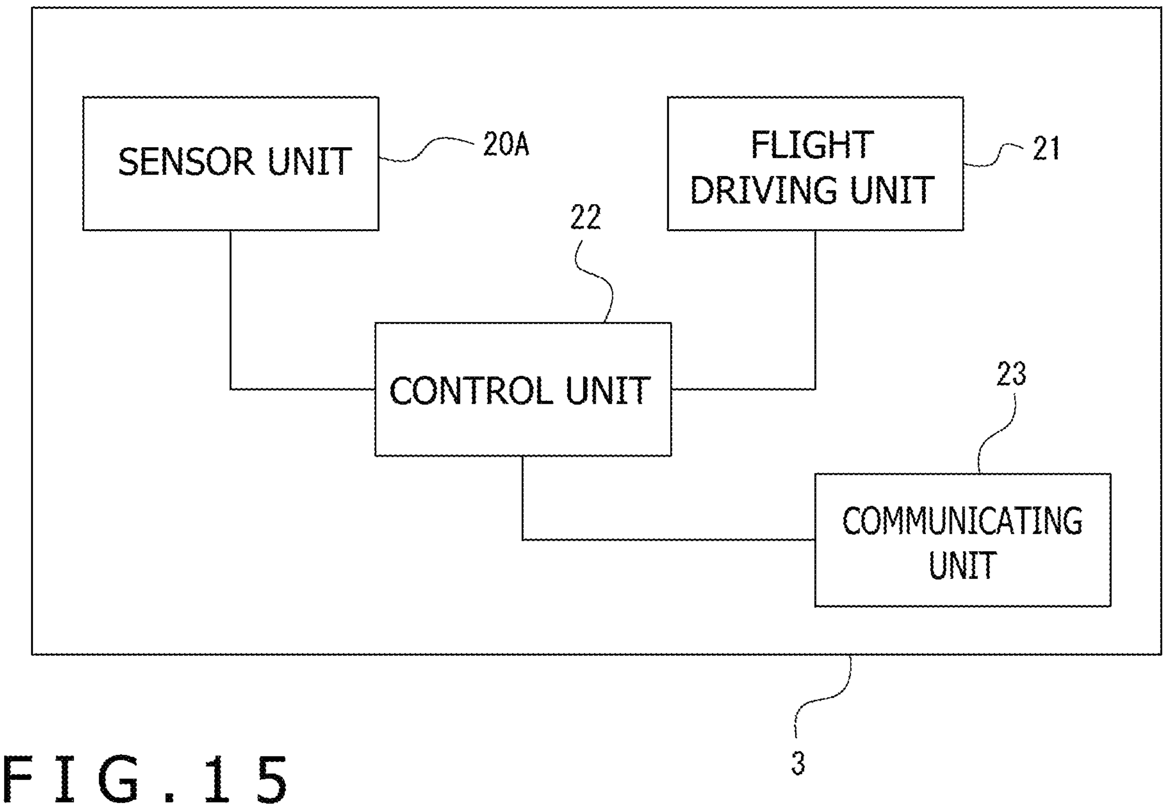
FIG. 14 is a diagram illustrating an example of an internal configuration of the macroscopic measuring unit in the second embodiment.

FIG. 14 is a diagram illustrating an example of an internal configuration of the macroscopic measuring unit 3 in the second embodiment.

The macroscopic measuring unit 3 in this case is provided with a sensor unit 20A in place of the sensor unit 20. The sensor unit 20A includes a multi-spectrum camera as the imaging device 250, and includes a light source spectroscopic sensor that receives light from the light source (the sun in this case) on a wavelength-by-wavelength basis, and performs wavelength spectroscopic detection with regard to the light source.

Figure 15:
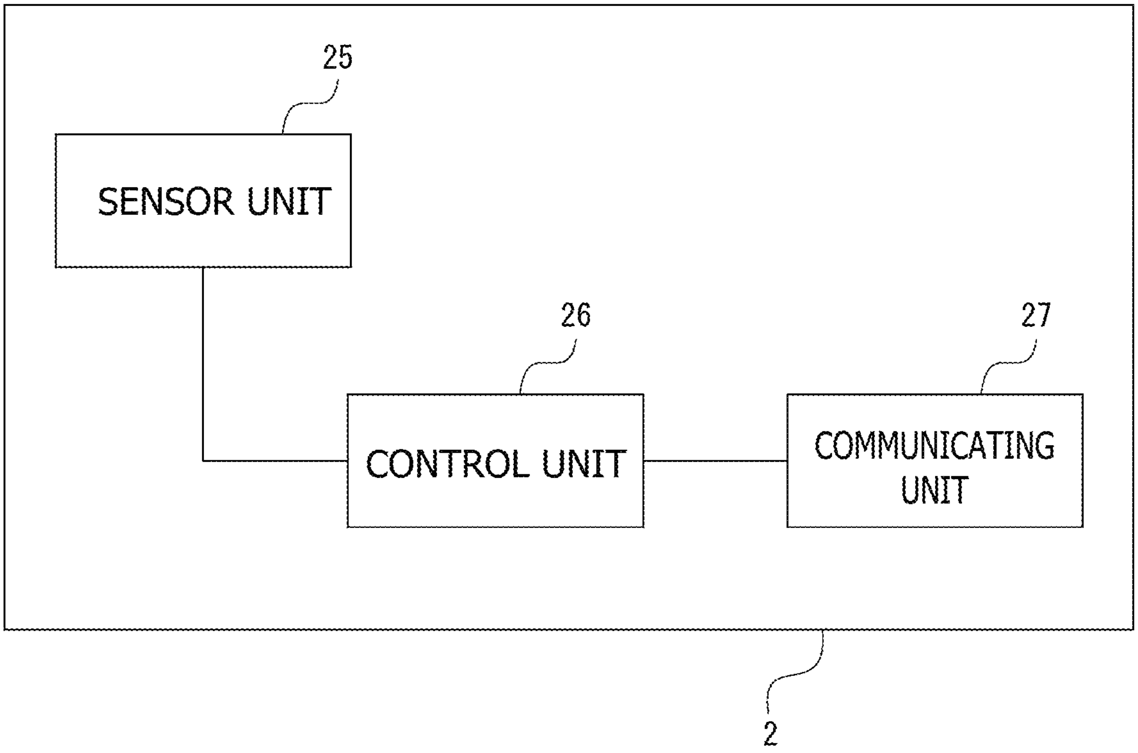
FIG. 15 is a diagram illustrating an example of an internal configuration of the microscopic measuring unit in the second embodiment.

FIG. 15 is a diagram illustrating an example of an internal configuration of a microscopic measuring unit 2 in the second embodiment.

As illustrated in the figure, the microscopic measuring unit 2 in the second embodiment includes a sensor unit 25, a control unit 26, and a communicating unit 27.

The sensor unit 25 includes a multi-spectrum camera as the imaging device 250, and includes a light source spectroscopic sensor that receives light from the light source (the sun in this case) on a wavelength-by-wavelength basis, and performs wavelength spectroscopic measurement with regard to the light source. This is to make the measurement of the spectral reflectance R(λ) possible also in the microscopic measurement.

Here, a calculated value of the spectral reflectance R(λ) differs depending on the angle of incident light from the light source with respect to the plant and the angle of reflected light from the plant. That is, in a case where the sun is the light source, when a time zone in which measurement is performed during a day differs, the value calculated as the spectral reflectance R(λ) also differs. This means that the values of the spectral reflectance R(λ) measured in different time zones cannot be compared with each other appropriately even though these values are the same evaluation value.

Therefore, the second embodiment corrects the spectral reflectance R(λ) to be used for macroscopic analysis in order to accommodate variations occurring depending on measurement time zones as described above. Specifically, this correction is made by a method of measuring the spectral reflectance R(λ) in each predetermined time zone (that is, each angle of the incident light from the sun) in advance by the microscopic measurement performed at a high frequency, or in other words, the microscopic measurement performed with a temporally high resolution, obtaining a correction coefficient for accommodating the above-described variations from the spectral reflectance R(λ) in each time zone, and correcting a macroscopically measured spectral reflectance R(λ) on the basis of the correction coefficient. Incidentally, details of the correction will be described later again.

In order to enable such correction of the macroscopically measured spectral reflectance R(λ), the sensor unit 25 included in the microscopic measuring unit 2 in this case is provided with a multi-spectrum camera and a light source spectroscopic sensor for enabling measurement of the spectral reflectance R(λ).

Incidentally, because the microscopic measuring unit 2 in this case is a fixed point measuring unit, the sensor unit 25 can also be provided with a sensor of a type buried in the soil. For example, a soil water content amount sensor that measures an amount of water content of the soil or the like may be provided.

The communicating unit 27 includes a microcomputer including, for example, a CPU, a ROM, a RAM, and the like. The communicating unit 27 performs operation control of the sensor unit 25, data communication with an external device via the communicating unit 27, and the like.

The communicating unit 27, for example, performs communication processing via a network including the Internet and communication by wire or wirelessly (for example, short-range wireless communication or the like) with a peripheral device.

Here, because the microscopic measuring unit 2 in this case is fixedly installed, a communicating unit that performs wire communication may be used as the communicating unit 27. Alternatively, the communicating unit 27 in this case may be one that supports LPWA (Low Power Wide Area) communication or the like.

Incidentally, the microscopic measuring unit 2 in this case may be configured to be externally supplied with power by wire and can therefore adopt a battery-less configuration.

Here, the hardware configuration of the information processing device 1 in the measurement system according to the second embodiment is similar to that described with reference to FIG. 4, and therefore, a renewed description with reference to figures will be omitted.

2-2. Measuring Method as Second Embodiment

Figure 16:
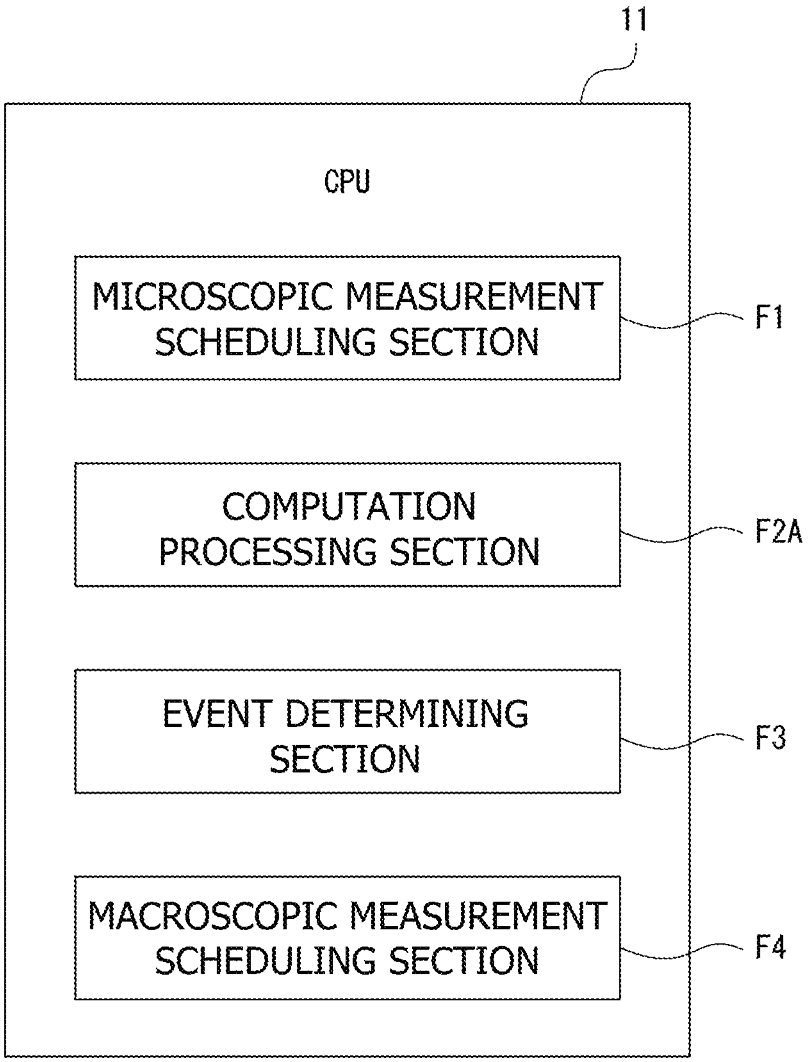
FIG. 16 is a functional block diagram illustrating functions as the second embodiment which functions are possessed by the information processing device.

FIG. 16 is a functional block diagram illustrating functions as the second embodiment which functions are possessed by the CPU 11 of the information processing device 1 in the second embodiment.

As is understood from comparison with the preceding FIG. 5, the CPU 11 in this case is different as compared with the CPU 11 in the case of the first embodiment in that the CPU 11 in this case has a computation processing section F2A in place of the computation processing section F2.

As with the computation processing section F2, the computation processing section F2A has a function of calculating the PRI on the basis of the measurement results of the microscopic measuring unit 2 and the macroscopic measuring unit 3. However, the computation processing section F2A is different in that the computation processing section F2A further has a function of calculating the above-described spectral reflectance R(λ) on the basis of the measurement results of the microscopic measuring unit 2 and the macroscopic measuring unit 3.

In addition, the computation processing section F2A performs time lapse analysis processing of the spectral reflectance R(λ) calculated on the basis of the measurement result of the microscopic measuring unit 2.

This time lapse analysis processing is performed as processing of generating direction-dependent reflection mode information.

Here, the direction-dependent reflection mode information means information indicating changes in reflection with respect to changes in the incidence angle θi of light from the light source with respect to the measurement target object and the reflection angle θr of light from the target object.

In the present example, processing of generating a BRF (Bidirectional Reflectance Factor) table is performed as the time lapse analysis processing.

FIG. 17 is a diagram of assistance in explaining the BRF table.

The BRF table is table information in which the spectral reflectance R(λ) is associated with each combination of each incidence angle θi of the light from the light source with respect to the target object, each reflection angle θr of the light from the target object, and each relative azimuth angle (difference between an incidence azimuth angle φi and a reflection azimuth angle φr: φi−φr).

Figure 18:
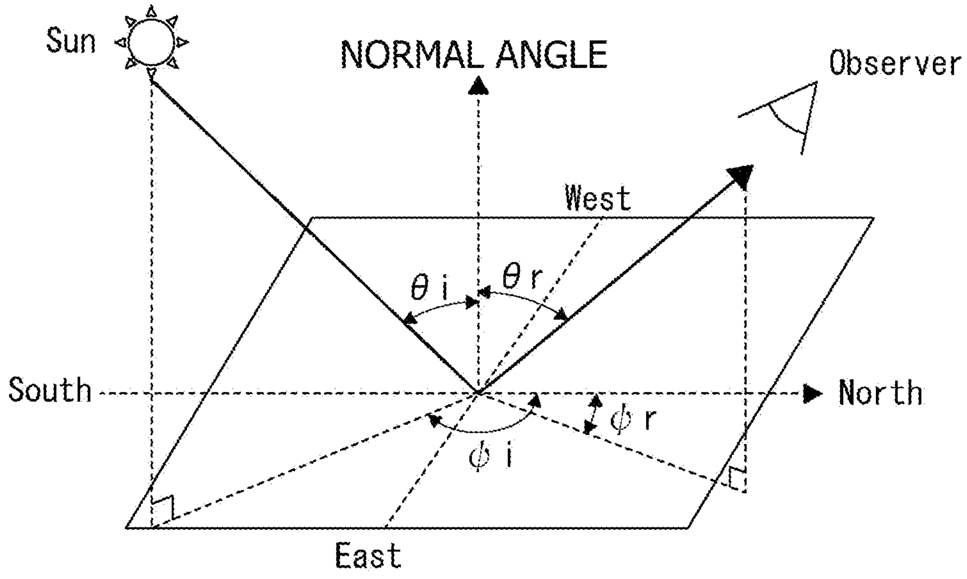
FIG. 18 is a diagram of assistance in explaining an incidence angle, a reflection angle, and a relative azimuth angle handled by a BRF.

Here, as illustrated in FIG. 18, each of the incidence angle θi and the reflection angle θr is an angle with respect to a normal angle to the target object. Specifically, the incidence angle θi and the reflection angle θr are each obtained as an angle of inclination from the normal angle as in FIG. 18.

In addition, the incidence azimuth angle φi represents the azimuth angle of a direction in which the light source is present with respect to the target object, and the reflection azimuth angle or represents the azimuth angle of a direction in which a point of observation of the reflected light is present with respect to the target object.

In addition, the computation processing section F2A also performs processing of correcting the spectral reflectance R(λ) calculated on the basis of the measurement result of the macroscopic measuring unit 3 on the basis of the BRF table generated by the time lapse analysis processing described above.

A method of correcting the macroscopically measured spectral reflectance R(λ) will be described with reference to FIG. 19.

First, a lower part of the figure illustrates the spectral reflectance R(λ) calculated on the basis of the macroscopically measured spectral reflectance R(λ), that is, the measurement result of the macroscopic measuring unit 3.

At this time, the macroscopic measuring unit 3 does not perform each measurement related to the spectral reflectance R(λ) at a fixed time, but the time zone of the measurement usually varies. Therefore, even when the spectral reflectance R(λ) measured at a certain timing and the spectral reflectance R(λ) measured in another timing are to be compared with each other as macroscopic analysis, it is difficult to make an accurate comparison because these spectral reflectances R(λ) are measured under combinations of different incidence angles θi, different reflection angles θr, and different relative azimuth angles.

Accordingly, suppose that, in macroscopic analysis processing, the spectral reflectance R(λ) is corrected to be a value measured in a certain reference time zone (for example, noon when the reference time zone is noon) irrespective of an actual measurement time zone (that is, a combination of the incidence angle θi, the reflection angle θr, and the relative azimuth angle). This enables an accurate value comparison to be made between a plurality of spectral reflectances R(λ) calculated from measurement results in different timings.

Specifically, the correction in this case is made as follows.

First, as illustrated in the lower part of FIG. 19, the macroscopically measured spectral reflectance R(λ) is set as "a." The macroscopically measured spectral reflectance R(λ) is calculated from a macroscopic measurement result in a certain time zone on a certain day. In the figure, an example is illustrated in which a combination of the incidence angle θi and the reflection angle θr in the certain time zone is "θi=15 deg and θr=15 deg." In the macroscopic analysis, this spectral reflectance R(λ) measured in the certain time zone is not used as it is, but is corrected to a spectral reflectance R(λ) in the reference time zone within the period of one day. Specifically, suppose that a combination of the incidence angle θi and the reflection angle θr corresponding to the "reference time zone" in this case is "θi=0 deg and θr=30 deg."

Incidentally, in the following, the combination of the incidence angle θi and the reflection angle θr in the reference time zone as "θi=0 deg and θr=30 deg" will be described as a "reference combination."

In addition, the combination of the incidence angle θi and the reflection angle θr at the macroscopically measured spectral reflectance R(λ) (that is, "θi=15 deg and θr=15 deg" in the present example) will be described as a "measurement time combination."

Here, in the BRF table illustrated in an upper part of FIG. 19, a spectral reflectance R(λ) whose combination of the incidence angle θi and the reflection angle θr is the "measurement time combination" is set as "b." In addition, in the BRF table, a spectral reflectance R(λ) whose combination of the incidence angle θi and the reflection angle θr is the "reference combination" is set as "c."

The correction of the macroscopically measured spectral reflectance R(λ) is made by calculating a correction coefficient k expressed by "c/b," as illustrated in the figure, and multiplying the macroscopically measured spectral reflectance R(λ) by the correction coefficient k. That is, the correction in this case can be expressed as "a×k."

Consequently, the spectral reflectance R(λ) obtained by a macroscopic measurement performed in the certain time zone of one day is corrected to be the value of the spectral reflectance R(λ) obtained by a macroscopic measurement performed in the reference time zone.

Incidentally, a method of correcting the spectral reflectance R(λ) by using the BRF table as described above can be reworded as the following method. That is, the spectral reflectance R(λ) calculated on the basis of the measurement result of the macroscopic measuring unit 3 is corrected on the basis of a measurement result based on a measurement performed by the microscopic measuring unit 2 in a time zone different from an execution time zone of a measurement by the macroscopic measuring unit 3.

Here, for appropriate corrections using the BRF table as described above, it is preferable to store information regarding combinations of many incidence angles θi and many reflection angles θr in the BRF table.

Therefore, the microscopic measurement scheduling section F1 in this case illustrated in FIG. 16 performs microscopic measurement scheduling so as to increase the frequency of measurement by the microscopic measuring unit 2. Specifically, the scheduling is performed such that measurement of the plurality of microscopic measurement areas Ami selected by the scheduling is performed at least a plurality of times in one day.

Here, the microscopic measurement scheduling section F1 in this case determines the execution intervals and the execution period of the microscopic measurement according to specification information of the microscopic measuring unit 2 configured as a fixed point measuring unit rather than the flight vehicle 200.

For example, the execution period of the microscopic measurement is determined in consideration of an operable period of about a few days in a case where a power supply of the microscopic measuring unit 2 is a solar battery and in consideration of the period of an entire life in a case of an IOT sensor that has ultra-low power consumption and whose battery is not replaced until the life. In addition, in a case where hot swap WiFi (WiFi is a registered trademark) is used for communication, the execution intervals of the measurement may be determined in consideration also of power necessary for a communication proxy from another sensor.

2-3. Processing Procedure

Referring to a flowchart of FIG. 20 and FIG. 21, description will be made of a specific example of a processing procedure for implementing a measuring method as the second embodiment described above.

Figure 20:
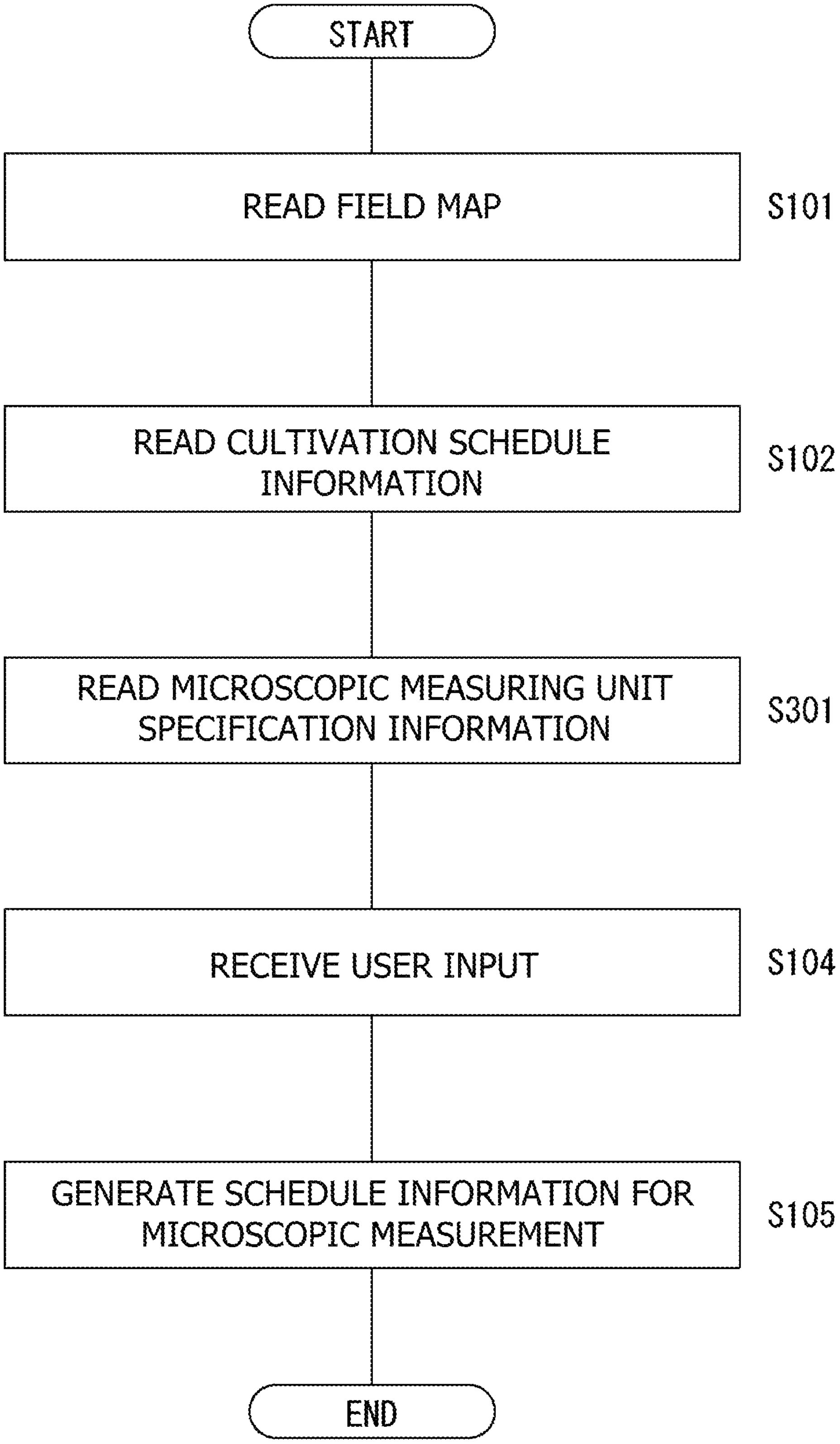
FIG. 20 is a flowchart of scheduling processing for microscopic measurement in the second embodiment.

FIG. 20 is a flowchart of scheduling processing for microscopic measurement in the second embodiment.

A difference from the processing in the case of the first embodiment which processing is illustrated in FIG. 10 described earlier lies in that the processing of step S301 is performed in place of step S103. In step S301, the CPU 11 performs, as processing of reading microscopic measuring unit specification information, processing of reading the specification information of the microscopic measuring unit 2 configured as a fixed point measuring unit.

The processing of step S105 in this case determines the execution intervals and the execution period of the microscopic measurement on the basis of the specification information read in step S301 described above. For example, the execution intervals and the execution period may be determined on the basis of a battery capacity of the microscopic measuring unit 2 or the like.

Figure 21:
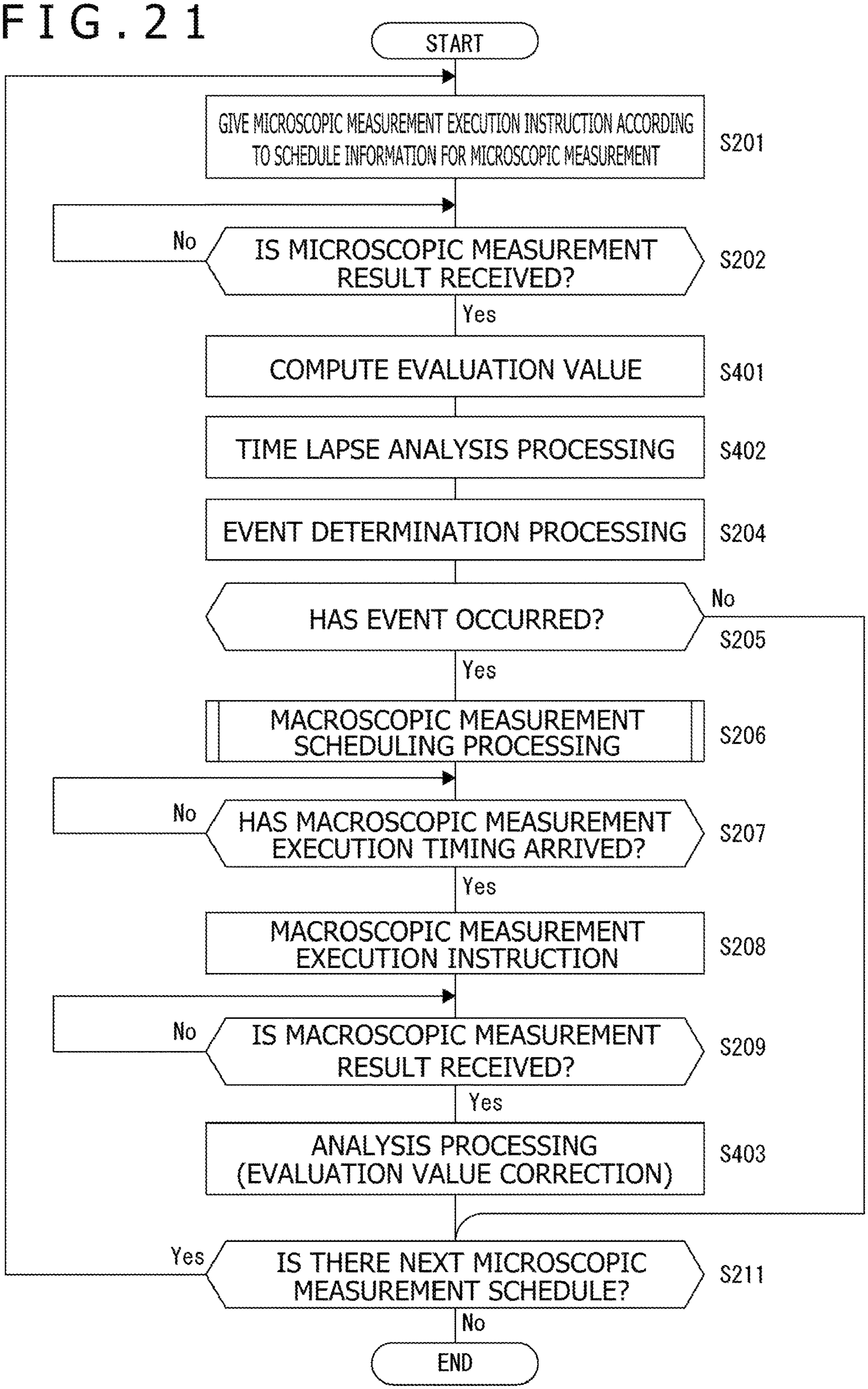
FIG. 21 is a flowchart of processing for implementing event determination, macroscopic measurement, and the correction of an evaluation value in the second embodiment.

FIG. 21 is a flowchart of processing for implementing event determination, macroscopic measurement, and the correction of the evaluation value in the second embodiment.

As is understood by comparison with FIG. 11 described earlier, as in the case of the first embodiment, the second embodiment also makes the microscopic measuring unit 2 perform measurement according to the schedule information for the microscopic measurement and waits to receive a measurement result (S201, S202, and S211), determines the presence or absence of the event on the basis of a microscopic measurement result (S204 and S205), and performs macroscopic measurement scheduling and makes the macroscopic measuring unit 3 perform measurement according to a schedule in a case where it is determined that the event has occurred (S206 to S208).

The CPU 11 in this case performs the evaluation value computation processing of step S401 in place of the evaluation value computation processing of step S203 in FIG. 11. Specifically, a computation that obtains the spectral reflectance R(λ) together with the PRI for the event determination is performed.

Then, the CPU 11 in this case performs time lapse analysis processing in step S402 according to completion of the computation processing of step S401. That is, processing for generating the BRF table described above is performed. Specifically, the BRF table as illustrated in FIG. 17 is generated by accumulating the information of the spectral reflectance R(λ) calculated in step S401 and the combination information of the incidence angle θi, the reflection angle θr, and the relative azimuth angle corresponding to the measurement time zone of a microscopic measurement result used for the computation of the spectral reflectance R(λ) each time a microscopic measurement is performed.

Further, the CPU 11 in this case performs the analysis processing of step S403 in place of the analysis processing of step S210 illustrated in FIG. 11. The analysis processing in this step S403 performs analysis using the PRI calculated on the basis of a macroscopic measurement result and analysis using the spectral reflectance R(λ) calculated on the basis of the same macroscopic measurement result.

At this time, the spectral reflectance R(λ) calculated on the basis of the macroscopic measurement result is corrected with use of the correction coefficient k described above. Specifically, the correction coefficient k is calculated from the BRF table by the method described with reference to FIG. 19 described earlier on the basis of the combination information of the incidence angle θi and the reflection angle θr corresponding to a time zone in which the macroscopic measurement is performed and the combination information of the incidence angle θi and the reflection angle θr corresponding to the reference time zone, and the spectral reflectance R(λ) calculated on the basis of the macroscopic measurement result is multiplied by the correction coefficient k.

Making description for confirmation, the spectral reflectance R(A) is an evaluation value for each wavelength, and therefore, the calculation of the correction coefficient k and the correction of the spectral reflectance R(λ) described above are made for each wavelength.

Incidentally, while, in the foregoing, an example of generating the BRF table is cited as an example of the "direction-dependent reflection mode information" to be used for the correction of the macroscopically measured spectral reflectance R(λ), function information as a BRDF (Bidirectional Reflectance Distribution Function) can also be generated as the direction-dependent reflection mode information.

Even if there is a set of an incidence angle θi and a reflection angle θr for which the spectral reflectance R(λ) cannot be calculated, the use of the BRDF makes it possible to interpolate the spectral reflectance R(λ) for the set by the calculation of the function.

In addition, in the second embodiment, in a case where the communicating unit 27 of the microscopic measuring unit 2 adopts a communication system that is disadvantageous in terms of a communication band, the communication system being LPWA (Low Power Wide Area) communication or the like, the evaluation value can be computed on the microscopic measuring unit 2 side in order to reduce an amount of transmission data.

3. Modifications

The embodiments are not limited to the specific examples described above, and configurations as various modifications can be adopted.

For example, in a case where a microscopic measurement is performed as a flight measurement as in the first embodiment, a charging station for the drone can be provided in advance in at least one of the plurality of microscopic measurement areas Ami to which to make rounds in one flight, and the drone can be made to land at the charging station and perform charging in a scheduled flight.

Figure 22:
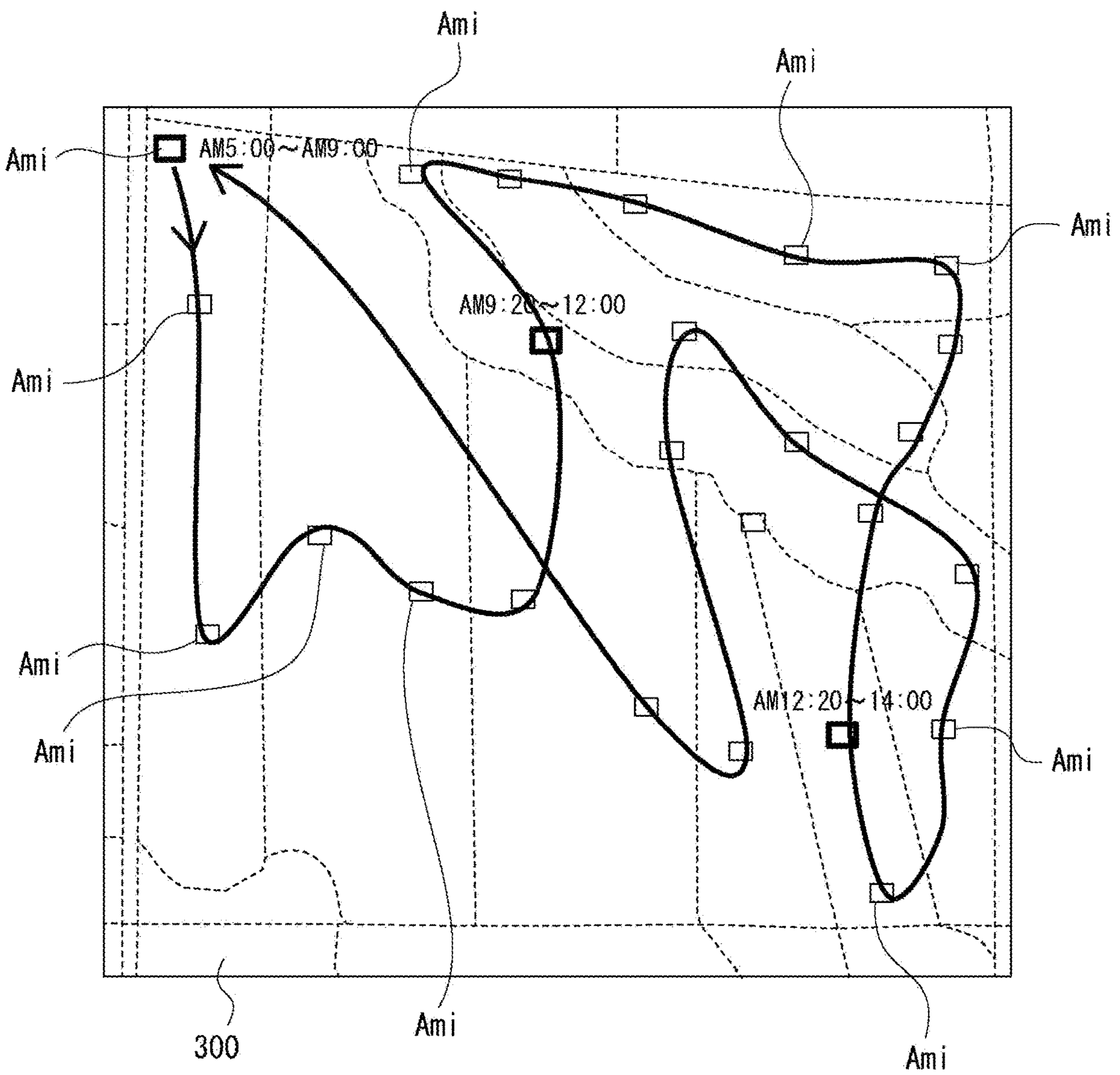
FIG. 22 is a diagram of assistance in explaining a microscopic measuring method as a modification.

For example, as illustrated in FIG. 22, charging stations are installed in advance in microscopic measurement areas Ami indicated by thick frames, for example, among the plurality of microscopic measurement areas Ami to which to make rounds.

At this time, the microscopic measuring unit 2 landed may perform measurement of a microscopic measurement area Ami in which the microscopic measuring unit 2 is landed during charging.

In addition, the charging station may include a communicating unit, and the microscopic measuring unit 2 may be enabled to transmit a measurement result to an external device such as the information processing device 1 via the communicating unit.

Further, in a case where the microscopic measuring unit 2 includes the event determining section F3, when the microscopic measuring unit 2 determines during charging or the like that the event has occurred, the microscopic measuring unit 2 may give an instruction to perform a macroscopic measurement to another drone (measuring unit).

In addition, at least one of the fixed point measuring units such as the microscopic measuring units 2 in the second embodiment may be a charging station. In that case, the drone may stop at the charging station, and perform a microscopic measurement at the charging station for a fixed period of time.

In addition, while, in the foregoing, an example is cited in which the measuring method according to the present technology is applied to a field of agriculture, the measuring method according to the present technology can also be applied to other than agriculture.

For example, as a security-related application, the present technology may be applied to event monitoring at a stadium or the like. In this case, the microscopic measurement areas may, for example, be an entrance portion and an exit portion of the stadium. When it is determined that an event (for example, crowdedness with people) has occurred in the entrance portion, a measurement may be performed with the inside of the stadium as a macroscopic measurement area, for example. Alternatively, when it is determined that an event (for example, crowdedness with people) has occurred in the exit portion, a measurement may be performed with a part beyond the exit portion (for example, a road to a nearest station) as a macroscopic measurement area, for example.

Alternatively, as a marine-related application, the present technology may be applied to monitoring for a red tide. For example, a predetermined plurality of areas on the ocean is set as microscopic measurement areas. In a case where it is determined that an event as a red tide has occurred in one microscopic measurement area, a prediction may be made as to where the area of the red tide is likely to expand from a flow of the tide, and a macroscopic measurement may be performed with the predicted area set as a macroscopic measurement area.

4. Summary of Embodiments

As described above, an information processing device (information processing device 1) according to an embodiment includes: an event determining section (event determining section F3) configured to determine occurrence or nonoccurrence of an event on the basis of a measurement result of a microscopic measuring unit configured to perform measurement of a microscopic measurement area as an area of a first size in a measurement target; and a control section (the CPU 11: the macroscopic measurement scheduling section F4) configured to perform control, in a case where the event determining section determines that the event has occurred, such that a macroscopic measuring unit configured to perform measurement of a macroscopic measurement area as an area of a larger size than the first size in the measurement target performs measurement targeted at the macroscopic measurement area having relation to the microscopic measurement area in which the event is determined to have occurred.

In the measurement of the macroscopic measuring unit, the target area has a large size. Therefore, the spatial resolution of the measurement tends to be low, and accuracy of determination of occurrence or nonoccurrence of the event also tends to be low. An improvement in the accuracy of determination of occurrence or nonoccurrence of the event is achieved by determining the occurrence or nonoccurrence of the event on the basis of the measurement result with regard to the microscopic measurement area of smaller size than the macroscopic measurement area, as described above.

In addition, a device form as a flight vehicle such, for example, as a drone, a device form as a stationary type fixedly disposed with respect to the measurement target, or the like is conceivable as the microscopic measuring unit. In any case, the frequency of the microscopic measurement is increased more easily than the frequency of the macroscopic measurement (the flight vehicle is at a lower altitude, or the stationary type obviates a need for a flight itself). There is thus an advantage in terms of the temporal resolution of measurement. An improvement in the accuracy of determination of occurrence or nonoccurrence of the event is achieved also in this respect.

Because an improvement in the accuracy of determination of occurrence or nonoccurrence of the event is achieved, a macroscopic analysis of the measurement target can be performed at a timing intended by the user, and an analysis intended by the user can be performed as the macroscopic analysis, so that an improvement in accuracy of the analysis can be achieved.

In addition, according to the above-described configuration, in a case where the event has occurred in the microscopic measurement area, the measurement targeted at the macroscopic measurement area having relation to the microscopic measurement area in which the event has occurred is performed as the macroscopic measurement. Consequently, it is possible to perform the macroscopic analysis by setting, as the macroscopic measurement area, an area having relation to the microscopic measurement area in which the event has occurred, such, for example, as an area in which a same kind of plant as in the microscopic measurement area in which the event has occurred is cultivated or an area having a soil property similar to that of the microscopic measurement area in which the event has occurred. That is, instead of performing the macroscopic analysis targeted at a needlessly large area, the macroscopic measurement for the macroscopic analysis can be performed efficiently while limited to the area having relation to the microscopic measurement area in which the event has occurred.

Hence, for the measurement system that performs the microscopic measurement and the macroscopic measurement of the measurement target, it is possible to achieve an improvement in accuracy of the macroscopic analysis of the measurement target which analysis is performed on the basis of the macroscopic measurement and an improvement in efficiency of the macroscopic measurement.

In addition, in the information processing device according to the embodiment, the microscopic measuring unit has a higher measurement execution frequency than the macroscopic measuring unit.

Thus, the occurrence or nonoccurrence of the event is determined on the basis of the measurement result of the microscopic measuring unit having a higher temporal resolution of measurement than the macroscopic measuring unit.

Hence, it is possible to achieve an improvement in the accuracy of determination of occurrence or nonoccurrence of the event, and achieve an improvement in accuracy of the macroscopic analysis of the measurement target which analysis is performed on the basis of the measurement result of the macroscopic measuring unit.

Further, in the information processing device according to the embodiment, the microscopic measuring unit has a higher spatial resolution of measurement than the macroscopic measuring unit.

Thus, the occurrence or nonoccurrence of the event is determined on the basis of the measurement result of the microscopic measuring unit having a higher spatial resolution of measurement than the macroscopic measuring unit.

Hence, it is possible to achieve an improvement in the accuracy of determination of occurrence or nonoccurrence of the event and achieve an improvement in accuracy of the macroscopic analysis of the measurement target which analysis is performed on the basis of the measurement result of the macroscopic measuring unit.

Furthermore, in the information processing device according to the embodiment, the measurement target is a field in which a plant is cultivated, and the event determining section determines occurrence or nonoccurrence of an abnormal state related to an amount of water content of the plant as the occurrence or nonoccurrence of the event.

Thus, the macroscopic measurement targeted at the macroscopic measurement area related to the microscopic measurement area is performed according to the occurrence of an abnormality in the microscopic measurement area with regard to the amount of water content of the plant.

When the macroscopic measurement is performed with regard to the amount of water content of the plant, a mode of occurrence of an abnormality in the amount of water content of the plant can be analyzed from a macroscopic viewpoint, and the amount and timing of irrigation for the plant can be optimized on the basis of a result of the analysis.

In addition, in the information processing device according to the embodiment, the control section performs scheduling for measurement by the macroscopic measuring unit in a case where the event determining section determines that the event has occurred.

An appropriate macroscopic analysis may not be able to be performed when the macroscopic measurement is performed immediately after the timing of occurrence of the event. Accordingly, scheduling for the macroscopic measurement is performed, and the macroscopic measurement is made to be performed according to a schedule.

Hence, the macroscopic analysis can be performed at an appropriate timing, so that an improvement in accuracy of the macroscopic analysis can be achieved.

Further, in the information processing device according to the embodiment, the measurement target is a field in which a plant is cultivated, and the control section refers to a field map indicating a variety distribution of the cultivated plant in the field, and determines a scheduled measurement area for the macroscopic measuring unit on the basis of information regarding a cultivated variety in the microscopic measurement area in which the event is determined to have occurred.

Consequently, for example, an area in which a same variety of plant as in the microscopic measurement area in which the event has occurred is cultivated can be determined as the area scheduled for the macroscopic measurement. The area scheduled for the macroscopic measurement can thus be determined on the basis of relation in terms of the cultivated variety to the microscopic measurement area in which the event has occurred.

Hence, locational scheduling for the macroscopic measurement can be performed appropriately on the basis of the cultivated variety.

Furthermore, in the information processing device according to the embodiment, the measurement target is a field in which a plant is cultivated, and the control section refers to a soil map indicating a distribution of soil properties in the field and determines a scheduled measurement area for the macroscopic measuring unit on the basis of information regarding a soil property of the microscopic measurement area in which the event is determined to have occurred.

Consequently, for example, an area having a similar soil property to that of the microscopic measurement area in which the event has occurred can be determined as the area scheduled for the macroscopic measurement. The area scheduled for the macroscopic measurement can thus be determined on the basis of relation in terms of the soil property to the microscopic measurement area in which the event has occurred.

Hence, locational scheduling for the macroscopic measurement can be performed appropriately on the basis of the soil quality.

In addition, in the information processing device according to the embodiment, the measurement target is a field in which a plant is cultivated, the event determining section determines occurrence or nonoccurrence of an abnormal state related to an amount of water content of the plant as the occurrence or nonoccurrence of the event, and the control section determines a scheduled measurement timing for the macroscopic measuring unit on the basis of irrigation schedule information indicating an irrigation schedule for the field.

An abnormality related to the amount of water content of the plant tends to occur immediately before an irrigation.

Hence, according to the above-described configuration, as the macroscopic measurement, a measurement can be performed at a timing in which there is a strong possibility of the occurrence of an abnormality related to the amount of water content of the plant, so that an improvement in accuracy of the macroscopic analysis performed on the basis of the result of the macroscopic measurement can be achieved.

Further, in the information processing device according to the embodiment, the measurement target is a field in which a plant is cultivated, the event determining section determines occurrence or nonoccurrence of an abnormal state related to an amount of water content of the plant as the occurrence or nonoccurrence of the event, and the control section determines a scheduled measurement timing for the macroscopic measuring unit on the basis of weather forecast information.

An abnormality related to the amount of water content of the plant tends to occur in a case where a predetermined weather condition is satisfied, for example, in a case of consecutive days of fine weather or the like.

Hence, according to the above-described configuration, as the macroscopic measurement, a measurement can be performed at a timing in which there is a strong possibility of the occurrence of an abnormality related to the amount of water content of the plant, so that an improvement in accuracy of the macroscopic analysis performed on the basis of the result of the macroscopic measurement can be achieved.

Furthermore, the information processing device according to the embodiment includes a computing section (computation processing section F2A) configured to compute an evaluation value of the measurement target on the basis of a measurement result of the macroscopic measuring unit, and the computing section corrects the evaluation value on the basis of the measurement result of the measurement performed by the microscopic measuring unit in a time zone different from an execution time zone of the measurement by the macroscopic measuring unit.

There is a measurement target evaluation value whose calculated value differs depending on the time zone of the measurement. For example, one whose calculated value differs depending on the angle of sunlight with respect to the measurement target or the like is cited.

According to the above-described configuration, such an evaluation value can be corrected appropriately with use of measurement results in different time zones which measurement results are produced by the microscopic measurement (that is, a measurement having a high temporal resolution), so that an improvement in accuracy of the macroscopic analysis based on the evaluation value can be achieved.

In addition, in the information processing device according to the embodiment, the control section performs scheduling for the measurement by the microscopic measuring unit.

Thus, temporal and locational scheduling for the microscopic measurement can be performed such that the determination of occurrence or nonoccurrence of the event is made efficiently and appropriately.

Hence, according to the above-described configuration, an improvement in accuracy of the determination of occurrence or nonoccurrence of the event can be achieved, so that an improvement in accuracy of the macroscopic analysis of the measurement target can be achieved.

Further, in the information processing device according to the embodiment, the measurement target is a field in which a plant is cultivated, and the control section performs the scheduling for the measurement by the microscopic measuring unit on the basis of a field map indicating a variety distribution of the cultivated plant in the field.

Consequently, locational scheduling for the microscopic measurement can be performed from a viewpoint of the variety distribution of the plant.

Hence, an improvement in locational efficiency of the microscopic measurement can be achieved by, for example, performing the microscopic measurement limited to a plant cultivation area in which an abnormality related to an amount of water content tends to occur.

Furthermore, in the information processing device according to the embodiment, the measurement target is a field in which a plant is cultivated, and the control unit performs the scheduling for the measurement by the microscopic measuring unit on the basis of cultivation schedule information for the plant in the field.

Thus, temporal scheduling for the microscopic measurement can be performed from a viewpoint of a cultivation schedule for the plant.

Hence, an improvement in temporal efficiency of the microscopic measurement can be achieved by, for example, preventing an unnecessary measurement of an area that is not in a cultivation period.

In addition, in the information processing device according to the embodiment, the microscopic measuring unit is in a form of a flight vehicle, and the control section performs the scheduling for the measurement by the microscopic measuring unit on the basis of specification information related to a flight of the microscopic measuring unit.

Thus, the scheduling for the microscopic measurement can be performed on the basis of information regarding a flyable time, a flight altitude, or the like of the flight vehicle.

Hence, appropriate microscopic measurement scheduling based on capabilities of the flight vehicle can be performed, so that the determination of occurrence or nonoccurrence of the event can be made appropriately.

In addition, an information processing method according to an embodiment is an information processing method for an information processing device to perform processing including: determining occurrence or nonoccurrence of an event on the basis of a measurement result of a microscopic measuring unit configured to perform measurement of a microscopic measurement area as an area of a first size in a measurement target; and performing control, in a case where it is determined that the event has occurred, such that a macroscopic measuring unit configured to perform measurement of a macroscopic measurement area as an area of a larger size than the first size in the measurement target performs measurement targeted at the macroscopic measurement area having relation to the microscopic measurement area in which the event is determined to have occurred.

The information processing device as the embodiment described above can be implemented by such an information processing method.

Here, as an embodiment, a program can be considered which makes a computer device such, for example, as a CPU perform the processing described with reference to FIGS. 10 to 12, FIG. 20, FIG. 21, and the like.

That is, the program according to the embodiment is a program readable by a computer device, the program making the computer device implement: a function of determining occurrence or nonoccurrence of an event on the basis of a measurement result of a microscopic measuring unit configured to perform measurement of a microscopic measurement area as an area of a first size in a measurement target; and a function of performing control, in a case where it is determined that the event has occurred, such that a macroscopic measuring unit configured to perform measurement of a macroscopic measurement area as an area of a larger size than the first size in the measurement target performs measurement targeted at the macroscopic measurement area having relation to the microscopic measurement area in which the event is determined to have occurred.

Such a program enables the functions of the embodiment described above to be implemented in an apparatus as the information processing device 1.

The program as described above can be recorded in advance on an HDD as a recording medium included in an apparatus such as a computer device, in a ROM within a microcomputer including a CPU, and so forth.

Alternatively, the program can be temporarily or permanently stored (recorded) in advance on a removable recording medium such as a flexible disk, a CD-ROM (Compact Disc Read Only Memory), an MO (Magneto Optical) disk, a DVD (Digital Versatile Disc), a Blu-ray Disk (Blu-ray Disc (registered trademark)), a magnetic disk, a semiconductor memory, or a memory card. Such a removable recording medium can be provided as what is called packaged software.

In addition, such a program can be not only installed from the removable recording medium into a personal computer or the like but also downloaded from a download site via a network such as a LAN (Local Area Network), or the Internet.

It is to be noted that effects described in the present specification are merely illustrative and are not limited and that there may be other effects.

7. Present Technology

Note that the present technology can also adopt the following configurations.

(1)

An information processing device including:

an event determining section configured to determine occurrence or nonoccurrence of an event on the basis of a measurement result of a microscopic measuring unit configured to perform measurement of a microscopic measurement area as an area of a first size in a measurement target; and a control section configured to perform control, in a case where the event determining section determines that the event has occurred, such that a macroscopic measuring unit configured to perform measurement of a macroscopic measurement area as an area of a larger size than the first size in the measurement target performs measurement targeted at the macroscopic measurement area having relation to the microscopic measurement area in which the event is determined to have occurred.

(2)

The information processing device according to (1) above, in which the microscopic measuring unit has a higher measurement execution frequency than the macroscopic measuring unit.

(3)

The information processing device according to (1) or (2) above, in which the microscopic measuring unit has a higher spatial resolution of measurement than the macroscopic measuring unit.

(4)

The information processing device according to any one of (1) to (3) above, in which the measurement target includes a field in which a plant is cultivated, and the event determining section determines occurrence or nonoccurrence of an abnormal state related to an amount of water content of the plant as the occurrence or nonoccurrence of the event.

(5)

The information processing device according to any one of (1) to (4) above, in which the control section performs scheduling for measurement by the macroscopic measuring unit in a case where the event determining section determines that the event has occurred.

(6)

The information processing device according to (5) above, in which the measurement target includes a field in which a plant is cultivated, and the control section refers to a field map indicating a variety distribution of the cultivated plant in the field, and determines a scheduled measurement area for the macroscopic measuring unit on the basis of information regarding a cultivated variety in the microscopic measurement area in which the event is determined to have occurred.

(7)

The information processing device according to (5) above, in which the measurement target includes a field in which a plant is cultivated, and the control section refers to a soil map indicating a distribution of soil properties in the field, and determines a scheduled measurement area for the macroscopic measuring unit on the basis of information regarding a soil property of the microscopic measurement area in which the event is determined to have occurred.

(8)

The information processing device according to any one of (5) to (7) above, in which the measurement target includes a field in which a plant is cultivated, the event determining section determines occurrence or nonoccurrence of an abnormal state related to an amount of water content of the plant as the occurrence or nonoccurrence of the event, and the control section determines a scheduled measurement timing for the macroscopic measuring unit on the basis of irrigation schedule information indicating an irrigation schedule for the field.

(9)

The information processing device according to any one of (5) to (8) above, in which the measurement target includes a field in which a plant is cultivated, the event determining section determines occurrence or nonoccurrence of an abnormal state related to an amount of water content of the plant as the occurrence or nonoccurrence of the event, and the control section determines a scheduled measurement timing for the macroscopic measuring unit on the basis of weather forecast information.

(10)

The information processing device according to (2) above, including:

a computing section configured to compute an evaluation value of the measurement target on the basis of a measurement result of the macroscopic measuring unit, in which the computing section corrects the evaluation value on the basis of the measurement result of the measurement performed by the microscopic measuring unit in a time zone different from an execution time zone of the measurement by the macroscopic measuring unit.

(11)

The information processing device according to any one of (1) to (10) above, in which the control section performs scheduling for measurement by the microscopic measuring unit.

(12)

The information processing device according to (11) above, in which the measurement target includes a field in which a plant is cultivated, and the control section performs the scheduling for the measurement by the microscopic measuring unit on the basis of a field map indicating a variety distribution of the cultivated plant in the field.

(13)

The information processing device according to (11) or (12) above, in which the measurement target includes a field in which a plant is cultivated, and the control unit performs the scheduling for the measurement by the microscopic measuring unit on the basis of cultivation schedule information for the plant in the field.

(14)

The information processing device according to any one of (11) to (13) above, in which the microscopic measuring unit is in a form of a flight vehicle, and the control section performs the scheduling for the measurement by the microscopic measuring unit on the basis of specification information related to a flight of the microscopic measuring unit.

(15)

An information processing method for an information processing device to perform processing, including:

determining occurrence or nonoccurrence of an event on the basis of a measurement result of a microscopic measuring unit configured to perform measurement of a microscopic measurement area as an area of a first size in a measurement target; and performing control, in a case where it is determined that the event has occurred, such that a macroscopic measuring unit configured to perform measurement of a macroscopic measurement area as an area of a larger size than the first size in the measurement target performs measurement targeted at the macroscopic measurement area having relation to the microscopic measurement area in which the event is determined to have occurred.

(16)

A program readable by a computer device, the program causing the computer device to implement:

a function of determining occurrence or nonoccurrence of an event on the basis of a measurement result of a microscopic measuring unit configured to perform measurement of a microscopic measurement area as an area of a first size in a measurement target; and a function of performing control, in a case where it is determined that the event has occurred, such that a macroscopic measuring unit configured to perform measurement of a macroscopic measurement area as an area of a larger size than the first size in the measurement target performs measurement targeted at the macroscopic measurement area having relation to the microscopic measurement area in which the event is determined to have occurred.

REFERENCE SIGNS LIST

1: Information processing device
2: Microscopic measuring unit
3: Macroscopic measuring unit
4: Measurement target
200: Flight vehicle
250: Imaging device
300: Field
RZ2: Microscopic measurement range
RZ3: Macroscopic measurement range
20: Sensor unit
21: Flight driving unit
22: Control unit
23: Communicating unit
11: CPU
12: ROM
13: RAM
14: Nonvolatile memory unit
15: Input-output interface
16: Input unit
17: Display unit
18: Audio output unit
19: Storage unit
20: Communicating unit
21: Drive
22: Removable storage medium
23: Bus
25: Sensor unit
26: Control unit
27: Communicating unit
F1: Microscopic measurement scheduling section
F2, F2A: Computation processing section
F3: Event determining section
F4: Macroscopic measurement scheduling section
CAmi: Candidate area
Ami: Microscopic measurement area

The invention claimed is:

1. An information processing device, comprising:

an event determining section configured to determine occurrence or nonoccurrence of an event on a basis of a measurement result of a microscopic measuring unit, wherein the microscopic measuring unit is configured to perform a measurement of a microscopic measurement area as an area of a first size in a measurement target;

a control section configured to control a macroscopic measuring unit that is configured to perform a measurement of a macroscopic measurement area as an area of a larger size than the first size in the measurement target, wherein, upon the event determining section determining that the event has occurred, the control section is configured to control the macroscopic measuring unit to perform the measurement targeted at the macroscopic measurement area having relation to the microscopic measurement area in which the event is determined to have occurred, and wherein the microscopic measuring unit has a higher measurement execution frequency than a measurement execution frequency of the macroscopic measuring unit; and a computing section configured to compute an evaluation value of the measurement target on a basis of a measurement result of the macroscopic measuring unit, wherein the computing section is configured to correct the evaluation value on a basis of a measurement result of a measurement performed by the microscopic measuring unit in a time zone different from an execution time zone of the measurement by the macroscopic measuring unit.

2. The information processing device according to claim 1, wherein the microscopic measuring unit has a higher spatial resolution of measurement than the macroscopic measuring unit.

3. The information processing device according to claim 1, wherein the measurement target includes a field in which a plant is cultivated, and the event determining section is further configured to determine occurrence or nonoccurrence of an abnormal state related to an amount of water content of the plant as the occurrence or nonoccurrence of the event.

4. The information processing device according to claim 1, wherein the control section is further configured to perform scheduling for the measurement by the macroscopic measuring unit upon the event determining section determining that the event has occurred.

5. The information processing device according to claim 4, wherein the measurement target includes a field in which a plant is cultivated, and the control section refers to a field map indicating a variety distribution of the cultivated plant in the field, and is further configured to determine a scheduled measurement area for the macroscopic measuring unit on a basis of information regarding a cultivated variety in the microscopic measurement area in which the event is determined to have occurred.

6. The information processing device according to claim 2, wherein the measurement target includes a field in which a plant is cultivated, and the control section refers to a soil map indicating a distribution of soil properties in the field, and is further configured to determine a scheduled measurement area for the macroscopic measuring unit on a basis of information regarding a soil property of the microscopic measurement area in which the event is determined to have occurred.

7. The information processing device according to claim 4, wherein the measurement target includes a field in which a plant is cultivated, the event determining section is further configured to determine occurrence or nonoccurrence of an abnormal state related to an amount of water content of the plant as the occurrence or nonoccurrence of the event, and the control section is further configured to determine a scheduled measurement timing for the macroscopic measuring unit on a basis of irrigation schedule information indicating an irrigation schedule for the field.

8. The information processing device according to claim 4, wherein the measurement target includes a field in which a plant is cultivated, the event determining section is further configured to determine occurrence or nonoccurrence of an abnormal state related to an amount of water content of the plant as the occurrence or nonoccurrence of the event, and the control section is further configured to determine a scheduled measurement timing for the macroscopic measuring unit on a basis of weather forecast information.

9. The information processing device according to claim 1, wherein the control section is further configured to perform scheduling for the measurement by the microscopic measuring unit.

10. The information processing device according to claim 9, wherein the measurement target includes a field in which a plant is cultivated, and the control section is further configured to perform the scheduling for the measurement by the microscopic measuring unit on a basis of a field map indicating a variety distribution of the cultivated plant in the field.

11. The information processing device according to claim 9, wherein the measurement target includes a field in which a plant is cultivated, and the control section is further configured to perform the scheduling for the measurement by the microscopic measuring unit on a basis of cultivation schedule information for the plant in the field.

12. The information processing device according to claim 9, wherein the microscopic measuring unit is in a form of a flight vehicle, and the control section is further configured to perform the scheduling for the measurement by the microscopic measuring unit on a basis of specification information related to a flight of the microscopic measuring unit.

13. An information processing method for an information processing device to perform processing, comprising:

determining occurrence or nonoccurrence of an event on a basis of a measurement result of a microscopic measuring unit configured to perform measurement of a microscopic measurement area as an area of a first size in a measurement target;

controlling a macroscopic measuring unit configured to perform measurement of a macroscopic measurement area as an area of a larger size than the first size in the measurement target, wherein, upon determining that the event has occurred, the controlling comprises controlling the macroscopic measuring unit to perform the measurement targeted at the macroscopic measurement area having relation to the microscopic measurement area in which the event is determined to have occurred, and wherein the microscopic measuring unit has a higher measurement execution frequency than the macroscopic measuring unit;

computing an evaluation value of the measurement target on a basis of a measurement result of the macroscopic measuring unit; and correcting the evaluation value on a basis of a measurement result of a measurement performed by the microscopic measuring unit in a time zone different from an execution time zone of the measurement by the macroscopic measuring unit.

14. A non-transitory computer-readable medium storing a program that, when executed by a computer device, causes the computer device to implement:

a function of determining occurrence or nonoccurrence of an event on a basis of a measurement result of a microscopic measuring unit configured to perform measurement of a microscopic measurement area as an area of a first size in a measurement target;

a function of controlling a macroscopic measuring unit configured to perform measurement of a macroscopic measurement area as an area of a larger size than the first size in the measurement target, wherein, upon determining that the event has occurred, the function of controlling comprises controlling the macroscopic measuring unit to perform the measurement targeted at the macroscopic measurement area having relation to the microscopic measurement area in which the event is determined to have occurred, and wherein the microscopic measuring unit has a higher measurement execution frequency than the macroscopic measuring unit;

a function of computing an evaluation value of the measurement target on a basis of a measurement result of the macroscopic measuring unit; and a function of correcting the evaluation value on a basis of a measurement result of a measurement performed by the microscopic measuring unit in a time zone different from an execution time zone of the measurement by the macroscopic measuring unit.

* * * * *